(12) United States Patent
Park

(10) Patent No.: US 10,122,938 B2
(45) Date of Patent: Nov. 6, 2018

(54) LENS MOVING APPARATUS AND CAMERA MODULE AND PORTABLE TERMINAL INCLUDING THE SAME

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/921,202

(22) Filed: Mar. 14, 2018

(65) Prior Publication Data
US 2018/0205861 A1   Jul. 19, 2018

Related U.S. Application Data

(63) Continuation of application No. 15/137,549, filed on Apr. 25, 2016, now Pat. No. 9,955,086.

(30) Foreign Application Priority Data

Apr. 24, 2015 (KR) .................. 10-2015-0057836
Jun. 26, 2015 (KR) .................. 10-2015-0090872

(51) Int. Cl.
*H04N 5/238*   (2006.01)
*H04N 5/225*   (2006.01)
(Continued)

(52) U.S. Cl.
CPC .............. *H04N 5/238* (2013.01); *G02B 7/08* (2013.01); *G02B 27/646* (2013.01); *G03B 3/10* (2013.01); *H04N 5/2253* (2013.01); *H04N 5/2254* (2013.01); *H04N 5/2257* (2013.01); *G03B 2205/0007* (2013.01); *G03B 2205/0069* (2013.01)

(58) Field of Classification Search
CPC .... H04N 5/238; H04N 5/2253; H04N 5/2254; H04N 5/2257; G02B 7/08; G02B 27/646; G03B 3/10; G03B 2205/0007; G03B 2205/0069
USPC ......................................................... 348/374
See application file for complete search history.

(56) References Cited

U.S. PATENT DOCUMENTS 5,682,097 A   10/1997   Bryant et al.
5,978,161 A   11/1999   Lemke
(Continued)

FOREIGN PATENT DOCUMENTS

JP   2014-126668 A   7/2014

OTHER PUBLICATIONS

Extended European Search Report dated Sep. 27, 2016 in European Application No. 16164859.7.

*Primary Examiner* — Nhan T Tran
(74) *Attorney, Agent, or Firm* — Saliwanchik, Lloyd & Eisenschenk

(57) ABSTRACT

Embodiments provide a lens moving apparatus including a housing supporting a magnet, a bobbin having an outer circumferential surface on which a first coil is disposed, the bobbin moving in the housing in a first direction, upper and lower elastic members each connected to both the housing and the bobbin, and a second coil disposed so as to be spaced apart from the first coil in the first direction, wherein the second coil generates induction voltage resulting from inductive interaction with the first coil when the bobbin moves in the first direction.

20 Claims, 30 Drawing Sheets

(51) Int. Cl.
*G02B 7/08* (2006.01)
*G02B 27/64* (2006.01)
*G03B 3/10* (2006.01)

(56) References Cited

U.S. PATENT DOCUMENTS

| | | | |
|---|---|---|---|
| 2008/0304154 A1 | 12/2008 | Lee | |
| 2012/0082442 A1* | 4/2012 | Kwon | H04N 5/2253 |
| | | | 396/55 |
| 2012/0200176 A1* | 8/2012 | Park | H04N 5/2254 |
| | | | 310/12.16 |
| 2013/0170055 A1 | 7/2013 | Yu | |
| 2014/0072289 A1* | 3/2014 | Lim | G02B 7/36 |
| | | | 396/55 |
| 2014/0307114 A1* | 10/2014 | Kim | H04N 5/2257 |
| | | | 348/208.12 |
| 2015/0177479 A1* | 6/2015 | Lee | G02B 7/09 |
| | | | 359/824 |
| 2015/0195438 A1* | 7/2015 | Park | H04N 5/2253 |
| | | | 348/345 |
| 2015/0207983 A1 | 7/2015 | Kang et al. | |
| 2015/0362696 A1* | 12/2015 | Han | G02B 7/08 |
| | | | 359/824 |
| 2017/0017056 A1* | 1/2017 | Park | G02B 7/08 |

* cited by examiner

LENS MOVING APPARATUS AND CAMERA MODULE AND PORTABLE TERMINAL INCLUDING THE SAME

CROSS-REFERENCE TO RELATED APPLICATIONS

This application is a continuation of U.S. application Ser. No. 15/137,549, filed Apr. 25, 2016; which claims priority under 35 U.S.C. § 119 to Korean Patent Application Nos. 10-2015-0057836, filed on Apr. 24, 2015; and 10-2015-0090872, filed on Jun. 26, 2015, which are hereby incorporated by reference in their entirety.

TECHNICAL FIELD

Embodiments relate to a lens moving apparatus and to a camera module and a portable terminal each including the same.

BACKGROUND

Cellular phones or smart phones, which are equipped with a camera module for fulfilling a function of taking a picture of an object and storing the still image or moving image based on the picture, are continually being developed. A camera module may generally include an image sensor module and a voice coil motor (VCM) for controlling the distance between a lens and the image sensor module.

Information technology products, such as cellular phones, smart phones, tablet PCs, notebook computers and the like, are provided therein with an ultracompact camera module. A voice coil motor may perform auto-focusing for controlling the distance between an image sensor and a lens so as to adjust the focal length of the lens.

A camera module may finely shake due to trembling of user's hand while a picture of an object is being taken. In this regard, in order to correct the distortion of images or moving images caused by the trembling of a user's hand, voice coil motors incorporating optical image stabilizers (OIS) are being developed.

In auto-focusing performed in a lens moving apparatus, a moving position of a bobbin in a first direction is controlled by detecting displacement of the bobbin in the first direction, which is the optical direction.

When an additional position detecting sensor is used in order to detect displacement of a bobbin in the first direction, there is a need to provide an additional PCB to mount the mounting of the position detecting sensor and to provide a structure for securing the PCB to a housing and a bobbin. Consequently, the cost of manufacturing the lens moving apparatus is increased due to the complicated structure, and the space required to install the additional component makes it difficult to realize a lens having large diameter.

In addition, since the additional position detecting sensor exhibits an extremely restricted linear range in its output due to the positional relationship between the position detecting sensor and a magnet, there is a necessity for improvement.

SUMMARY

Embodiments provide a lens moving apparatus, and a camera module and a portable terminal each including the same, which are able to assure linearity over a wider range, to increase a defect rate, and to perform more accurate AF feedback control.

Furthermore, embodiments provide a lens moving apparatus, and a camera module and a portable terminal each including the same, which are able to detect the position of a bobbin in a first direction using a simplified structure.

In one embodiment, a lens moving apparatus includes a housing supporting a magnet, a bobbin having an outer circumferential surface on which a first coil is disposed, the bobbin moving in the housing in a first direction, upper and lower elastic members each connected to both the housing and the bobbin, and a second coil disposed so as to be spaced apart from the first coil in the first direction, wherein the second coil generates induction voltage resulting from inductive interaction with the first coil when the bobbin moves in the first direction.

In another embodiment, a lens moving apparatus includes a housing supporting a first magnet, a bobbin disposed in the housing so as to be moved in the housing in a first direction, a first coil disposed on an outer circumferential surface of the bobbin so as to be opposite to the first magnet, an upper elastic member disposed above the bobbin so as to elastically support movement of the bobbin in the first direction, a lower elastic member disposed under the bobbin so as to elastically support the movement of the bobbin in the first direction, a second coil disposed under the first magnet, and a third coil disposed outside the housing.

In still another embodiment, a camera module includes the lens moving apparatus, and an image sensor mounted on the lens moving apparatus.

In a further embodiment, a portable terminal includes a display module including a plurality of pixels, the plurality of pixels exhibiting colors that vary in response to an electrical signal, a camera module according to claim 19, for converting an image, introduced through a lens, into an electrical signal, and a controller for controlling operation of the display module and the camera module.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Figure 1:
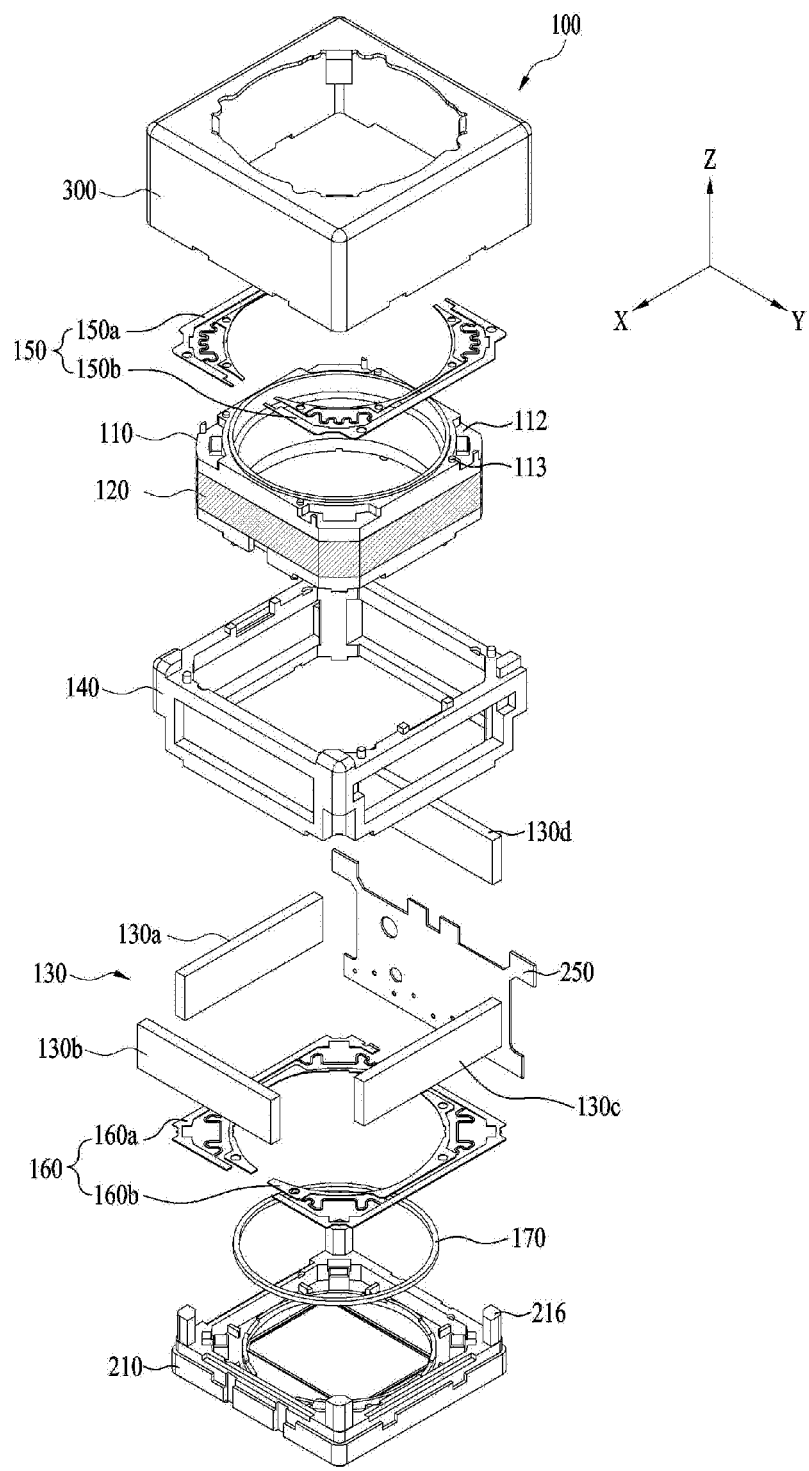
FIG. 1 is an exploded perspective view of a lens moving apparatus according to an embodiment of the present invention.

Hereinafter, embodiments will be described with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease of description, and drawings and elements thereof are not always shown at the proper scale.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

Figure 2:
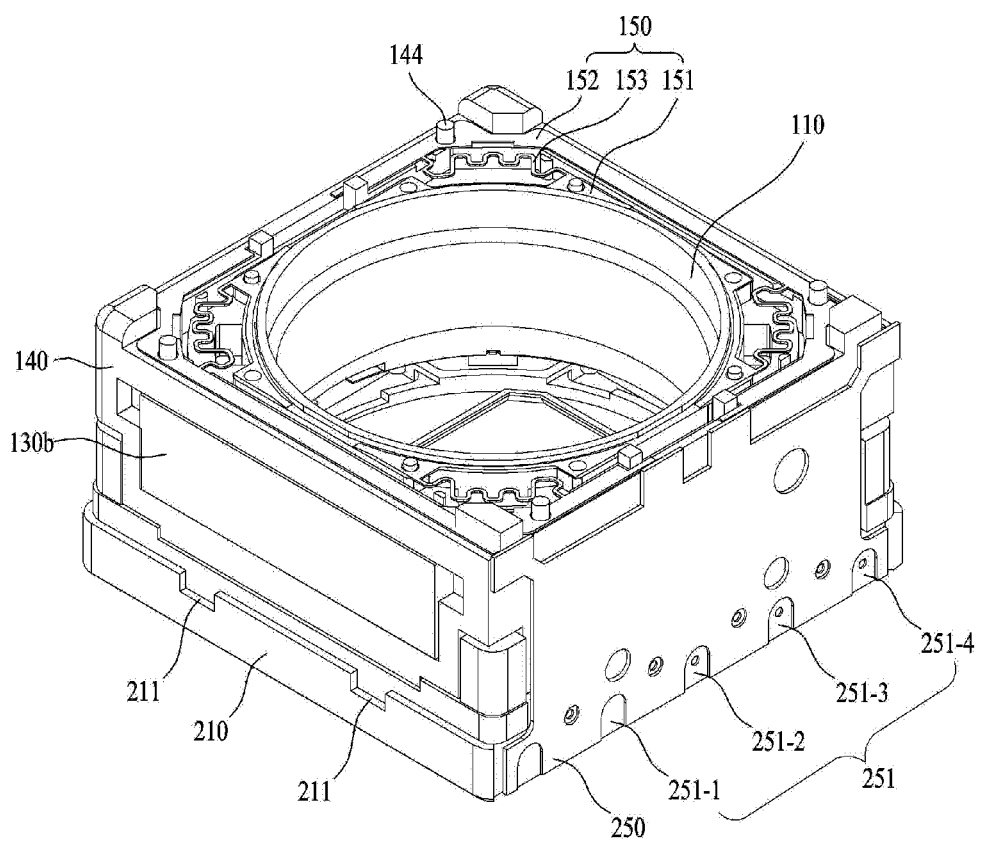
FIG. 2 is an assembled perspective view of the lens moving apparatus shown in FIG. 1, from which a cover member has been removed.

FIG. 1 is an exploded perspective view of a lens moving apparatus 100 according to an embodiment of the present invention. FIG. 2 is an assembled perspective view of the lens moving apparatus 100 shown in FIG. 1, from which a cover member 300 have been removed.

Referring to FIGS. 1 and 2, the lens moving apparatus 100 includes a cover member 300, a bobbin 110, a first coil 120, a magnet 130, a housing 140, an upper elastic member 150, a lower elastic member 160, a second coil 170, a base 210 and a circuit board 250.

First, the cover member 300 will be described.

The cover member 300 defines an accommodation space along with the base 210 so as to accommodate different components 110, 120, 130, 140, 150, 160 and 250.

The cover member 300 may generally take the form of a box which is open at the lower face thereof and has an upper end and side walls, and the lower portion of the cover member 300 may be coupled to the top of the base 210. The upper end of the cover member may have a polygonal shape, for example, a rectangular shape or an octagonal shape.

The cover member 300 may have a hole formed in the upper end thereof in order to expose a lens (not shown) coupled to the bobbin 110 to outside light. In addition, the hole in the cover member 300 may further be provided with a window formed of a light-transmitting material, in order to inhibit impurities, such as dust or moisture, from infiltrating into a camera module.

The cover member 300 may be made of a non-magnetic material such as SUS in order to inhibit it from being attracted to the magnet 130, but may also be made of a magnetic material so as to serve as a yoke.

Next, the bobbin 110 will be described.

The bobbin 110 is disposed inside the housing 140, and is movable in the first direction (for example, the z-axis direction or the optical direction) via electromagnetic interaction between the first coil 120 and the first magnet 130.

Although not shown in the drawings, the bobbin 110 may include a lens barrel (not shown) in which at least one lens is installed. The lens barrel may be coupled inside the bobbin 110 in various manners.

The bobbin 110 may have therein a bore for the mounting of the lens or the lens barrel. The bore in the bobbin 110 may have a circular, elliptical, or polygonal section, which coincides with the shape of the lens or the lens barrel to be mounted, without being limited thereto.

The bobbin 110 may include at least one upper support protrusion 113, which is formed on the upper surface thereof and is coupled and secured to the inner frame of the upper elastic member, and at least one lower support protrusion (not shown), which is formed on the lower surface thereof and is coupled and secured to an inner frame 161 of the lower elastic member 160.

The bobbin 110 may include an upper avoidance recess 112, which is formed in the region of the upper surface thereof that corresponds to a connection portion 153 of the upper elastic member 150. The bobbin 110 may further include a lower avoidance recess (not shown), which is formed in a region of the lower surface thereof that corresponds to a connection portion 163 of the lower elastic member 150. In another embodiment, the connection portion 153 of the upper elastic member 150 and the bobbin 110 may be designed so as not to interfere with each other, and the upper avoidance recess and/or the lower avoidance recess of the bobbin 110 may not be formed.

By virtue of the upper avoidance recess 112 and the lower avoidance recess (not shown) of the bobbin 110 according to the embodiment, when the bobbin 110 moves in the first direction, spatial interference between the connection portions 153 and 163 of the upper and lower elastic member 150 and 160 and the bobbin 110 may be inhibited, and the connection portions 153 and 163 of the upper and lower elastic members 150 and 160 may be easily and elastically deformed.

The bobbin 110 may include at least one recess (not shown), which is formed in the outer circumferential surface thereof such that the first coil 120 is disposed or mounted in the recess. The first coil 120 may be disposed or mounted in the recess. The shape and number of recesses may be varied so as to correspond to the shape and number of coils disposed on the outer circumferential surface of the bobbin 110. In another embodiment, the bobbin 110 may not include the recess for mounting the coil, and the first coil 120 may be directly wound around and secured to the outer circumferential surface of the bobbin 110.

Next, the first coil will be described.

The first coil 120 is disposed on the outer circumferential surface of the bobbin 110 so as to electromagnetically interact with the magnet 130 disposed on the housing 140. In order to create the electromagnetic force resulting from the electromagnetic interaction with the magnet 130, a driving signal may be applied to the first coil 120.

By the electromagnetic force resulting from the electromagnetic interaction between the first coil 120 and the magnet 130, the bobbin 110, which is elastically supported by the upper and lower elastic members 150 and 160, may be moved in the first direction. The movement of the bobbin 110 in the first direction may be controlled by controlling the electromagnetic force, thereby enabling the auto-focusing function to be fulfilled.

The first coil 120 may be wound around the outer circumferential surface of the bobbin 110 in such a manner as to wind the first coil 120 clockwise or counterclockwise about the optical axis. In another embodiment, the first coil 120 may be embodied as a coil ring, which is constructed by winding the first coil 120 clockwise or counterclockwise about an axis perpendicular to the optical axis, and the number of coil rings may be the same as the number of magnet 130, without being limited thereto.

The first coil 120 may be conductively connected to at least one of the upper and lower elastic members 150 and 160. A driving signal may be applied to the first coil 120 through at least one of the upper and lower elastic members 150 and 160.

Next, the housing 140 will be described.

Figure 3:
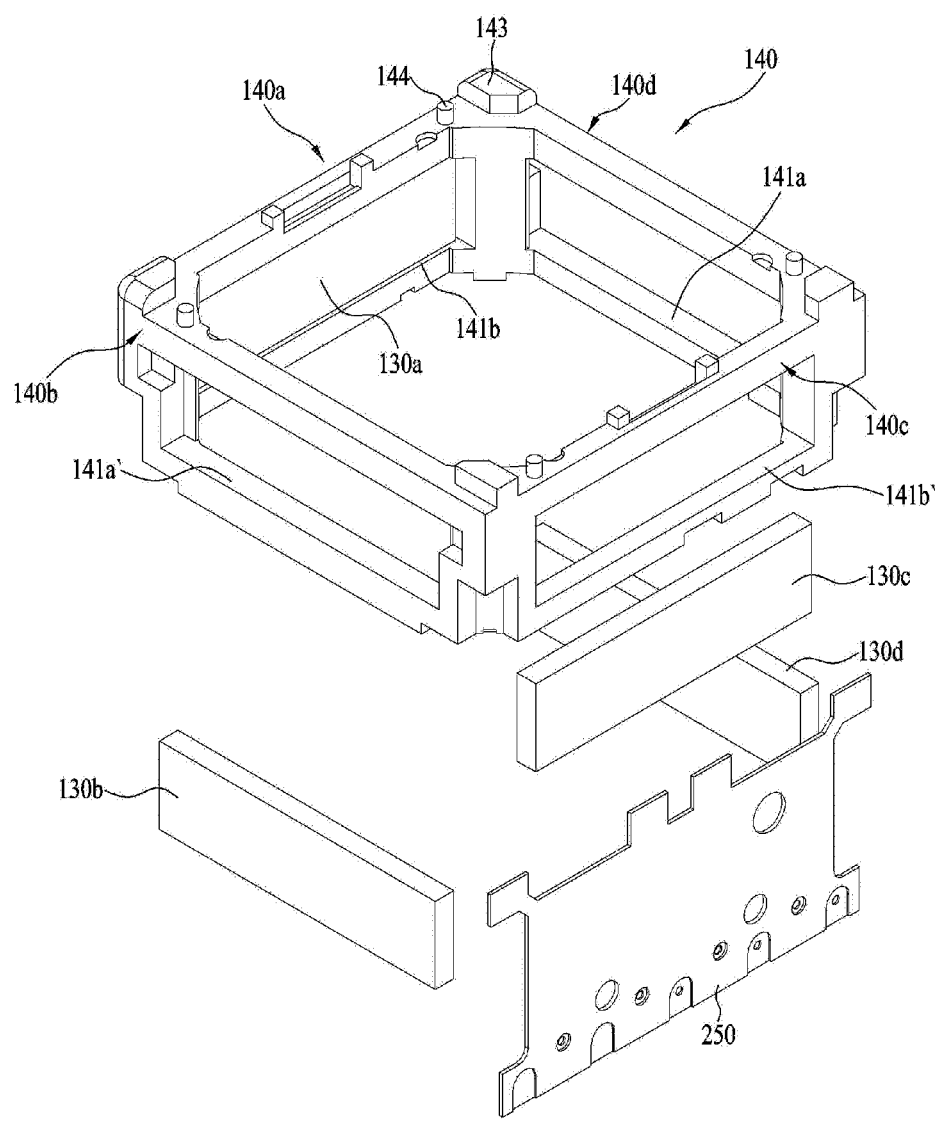
FIG. 3 is a schematic exploded perspective view illustrating a housing, a magnet and a circuit board, which are shown in FIG. 1.
Figure 4:
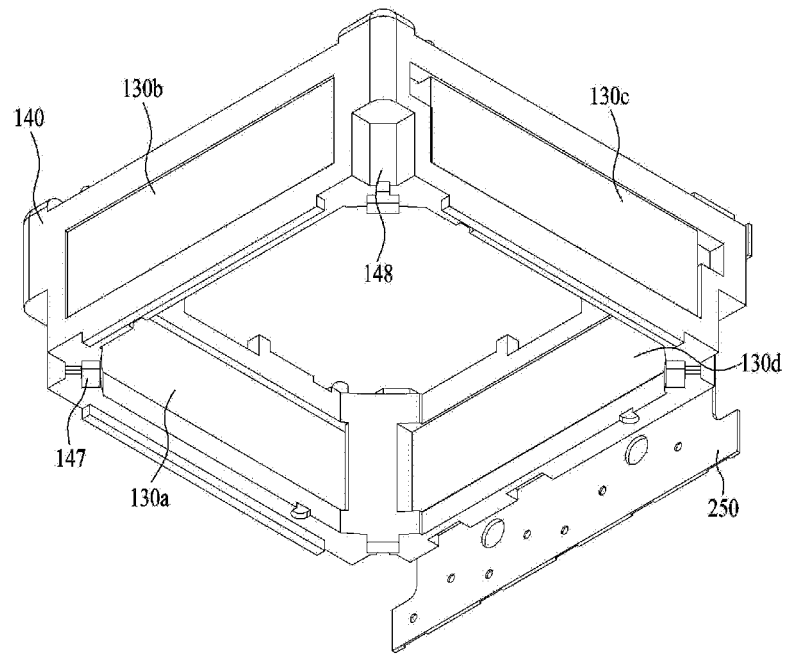
FIG. 4 is an assembled perspective view illustrating the housing, the magnet and the circuit board, which are shown in FIG. 3.

FIG. 3 is a schematic exploded perspective view illustrating the housing 140, the magnet 130 and the circuit board 250, which are shown in FIG. 1. FIG. 4 is an assembled perspective view illustrating the housing 140, the magnet 130 and the circuit board 250, which are shown in FIG. 3.

Referring to FIGS. 3 and 4, the housing 140 supports the magnet 130 and the circuit board 250, and accommodates the bobbin 110 therein so as to allow the bobbin 110 to move in the first direction, which is parallel to the optical axis.

The housing 140 may be configured to have a hollow column shape overall. For example, the housing 140 may include four side walls 140a to 140d, and may have a polygonal (e.g., a square or octagonal) or circular bore.

The side walls 140a to 140d of the housing 140 may include magnet holes 141a, 141a', 141b and 141b', in which magnets 130 are mounted, disposed or secured. Although the magnet holes 141a, 141a', 141b and 141b' are shown in FIG. 3 as having the form of a through-hole, the magnet hole may alternatively take the form of a recess, without being limited thereto.

The housing 140 may include a first stopper 143, which protrudes from the upper surface thereof.

The first stopper 143 of the housing 140, which is intended to inhibit the cover member 300 from colliding with the housing 140, may inhibit the upper surface of the housing 140 from directly colliding with the inner surface of the upper portion of the cover member 300 upon the application of external impact.

The housing 140 may be provided on the upper surface thereof with a plurality of upper frame support protrusions 144 to which an outer frame 152 of the upper elastic member 150 is coupled. The housing 140 may be provided on the lower surface thereof with a plurality of lower frame support protrusions 147 to which an outer frame 162 of the lower elastic member 160 is coupled.

The housing 140 may be provided in the corners thereof with lower guide recesses 148, to which guide members 216 of the base 210 are fitted, fastened or coupled.

Next, the magnet 130 will be described.

The magnet 130 may be disposed in the housing 140 so as to correspond to or to be aligned with the first coil 120. For example, the magnet 130 may be disposed in the magnet holes 141a, 141a', 141b and 141b' of the housing 140 so as to overlap the first coil 120 in the second and/or third direction.

In another embodiment, the magnet 130 may be disposed inside or outside the side walls 140a to 140d of the housing 140 without forming the magnet holes in the side walls 140a to 140d of the housing 140.

The magnet 130 may be configured to have a shape corresponding to the side walls 140a to 140d of the housing 140, for example, a rectangular shape, without being limited thereto.

The magnet 130 may be a monopolar magnetized magnet or a bipolar magnetized magnet, which is oriented such that the inner surface of the magnet, which faces the first coil 120 serves as an S pole, and the opposite outer surface of the magnet serves as an N pole. However, the disclosure is not limited thereto, and the reverse configuration is also possible.

Although the number of magnets 30 is four in the embodiment, the number of magnets may be at least two, without being limited thereto. Although the inner surface of the magnet 130 that faces the first coil 120 may be configured to be flat, the surface may be configured to be curved, without being limited thereto.

Next, the upper elastic member 150 and the lower elastic member 160 will be described.

Figure 5:
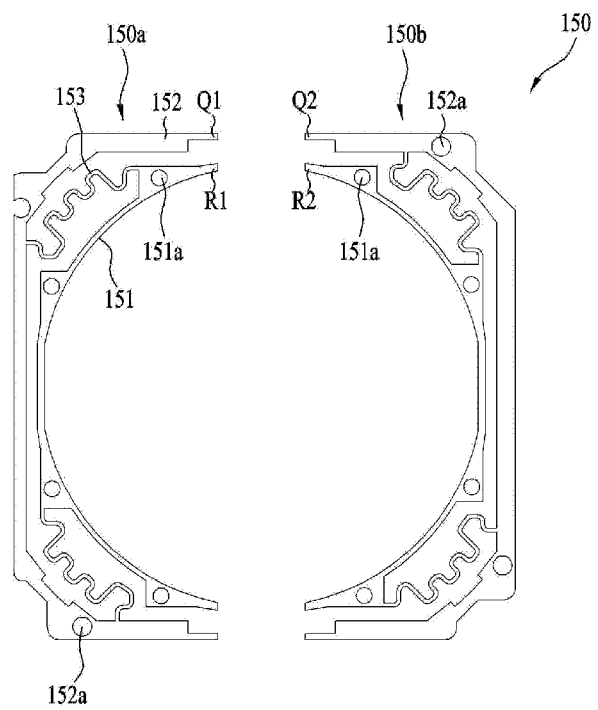
FIG. 5 is a plan view illustrating the upper elastic member shown in FIG. 1.
Figure 6:
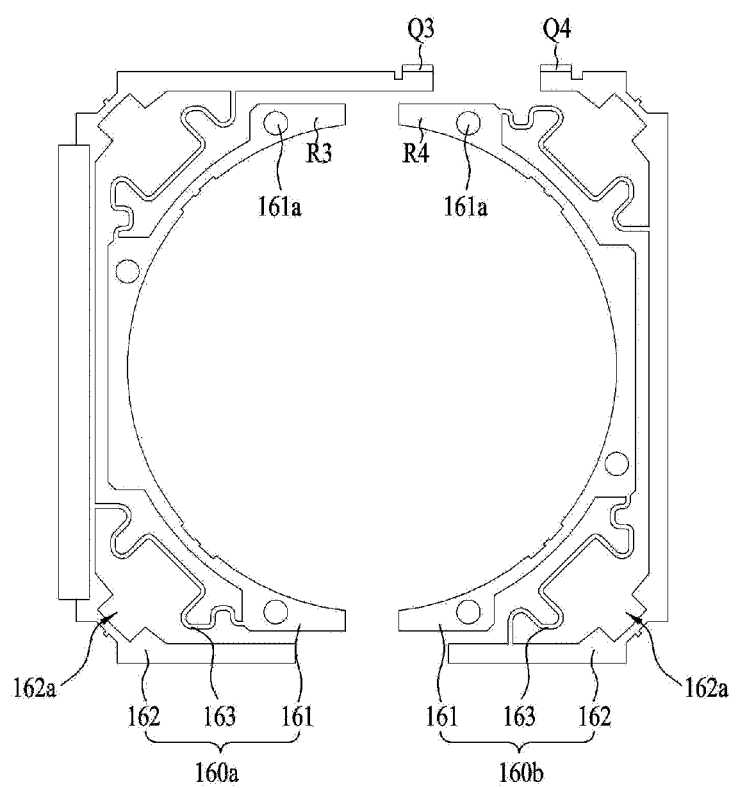
FIG. 6 is a plan view illustrating the lower elastic member shown in FIG. 1.

FIG. 5 is a plan view illustrating the upper elastic member 150 shown in FIG. 1. FIG. 6 is a plan view illustrating the lower elastic member 160 shown in FIG. 1.

Referring to FIGS. 5 and 6, the upper elastic member 150 and the lower elastic member 160 are coupled to the bobbin 110 and the housing 140 so as to elastically support the bobbin 110.

For example, the upper elastic member 150 may be coupled to an upper portion, upper surface or upper end of the bobbin 110 and an upper portion, upper surface or upper end of the housing 140, and the lower elastic member 160 may be coupled to a lower portion, lower surface or lower end of the bobbin 110 and a lower portion, lower surface of lower end of the housing 140.

At least one of the upper elastic member 150 and the lower elastic member 160 may be divided into two segments.

For example, the upper elastic member 150 may include first and second upper elastic members 150a and 150b, which are conductively separated from each other, and the lower elastic member 160 may include first and second lower elastic members 160a and 160b, which are conductively separated from each other. Although each of the upper elastic member 150 and the lower elastic member 160 may be embodied as a leaf spring, they may also be embodied as a coil spring, a suspension wire or the like, without being limited thereto.

Each of the first and second upper elastic members 150a and 150b may include an inner frame 151 coupled to the upper support protrusion 113 of the bobbin 110, an outer frame 152 coupled to the upper frame support protrusion 144 of the housing 140, and a first connection portion 153 connecting the inner frame 151 and the outer frame 152 to each other.

Each of the first and second lower elastic members 160a and 160b may include an inner frame 161 coupled to the lower support protrusion of the bobbin 110, an outer frame 162 coupled to the lower frame support protrusion 147 of the housing 140, and a second connection portion 163 connecting the inner frame 161 and the outer frame 162 to each other.

Each of the connection portions 153 and 163 of the upper and lower elastic members 150 and 160 may be bent or curved at least once so as to form a predetermined pattern. The upward and/or downward movement in the first direction of the bobbin 110 may be elastically (flexibly) supported by positional change or fine deformation of the connection portions 153 and 163.

The inner frame 151 of the first upper elastic member 150a may include a first inner connector R1, and the inner frame 151 of the second upper elastic member 150b may include a second inner connector R2.

One end of the first coil 120 (for example, the starting end of the first coil 120) may be conductively connected to the first inner connector R1 of the first upper elastic member 150a, and the other end of the first coil 120 (for example, the terminating end of the first coil 120) may be conductively connected to the second inner connector R2 of the second upper elastic member 150b.

The outer frame 152 of the first upper elastic member 150a may include a first outer connector Q1, and the outer frame 152 of the second upper elastic member 150b may include a second outer connector Q2.

A first terminal 251-1 of the circuit board 250 may be conductively connected to the first outer connector Q1, and a second terminal 251-2 of the circuit board 250 may be conductively connected to the second outer connector Q2.

The inner frame 161 of the first lower elastic member 160a may include a third inner connector R3, and the inner frame 161 of the second upper elastic member 160b may include a fourth inner connector R4.

One end of the second coil 170 (for example, the starting end of the second coil 170) may be conductively connected to the third inner connector R3, and the other end of the second coil 170 (for example, the terminating end of the second coil 170) may be conductively connected to the fourth inner connector R4.

The outer frame 162 of the first lower elastic member 160a may include a third outer connector Q3, and the outer frame 162 of the second lower elastic member 160b may include a fourth outer connector Q4.

A third terminal 251-3 of the circuit board 250 may be conductively connected to the third outer connector Q3, and a fourth terminal 251-4 of the circuit board 250 may be conductively connected to the fourth outer connector Q4.

Bonding between the first coil 120 and the first and second inner connectors R1 and R2, bonding between the circuit board 250 and the first and second outer connectors Q1 and Q2, bonding between the second coil 170 and the third and fourth inner connectors R3 and R4, and bonding between the circuit board 250 and the third and fourth outer connectors Q3 and Q4 may be implemented using thermal fusion, soldering or conductive epoxy (for example, Ag epoxy).

The first and second inner connectors R1 and R2 and the first and second outer connectors Q1 and Q2 may be disposed at various positions in accordance with a design specification.

In order to facilitate connection to the circuit board 250, the first and second inner connectors R1 and R2 and the first and second outer connectors Q1 and Q2 may be positioned at the inner frames and the outer frames of the first and second upper elastic members 150a and 150b, which are positioned adjacent to the circuit board 250.

The first inner connector R1 may be positioned at one end of the inner frame 151 of the first upper elastic member 150a, and the second inner connector R2 may be positioned at one end of the inner frame 151 of the second upper elastic member 150b. As illustrated in FIG. 5, the distance between one end of the inner frame of the first upper elastic member 150a and one end of the inner frame of the second upper elastic member 150b may be shorter than the distance between the one end of the inner frame of the first upper elastic member 150a and the other end of the inner frame of the second upper elastic member 150b.

In another embodiment, the distance between the one end of the inner frame of the first upper elastic member 150a and the one end of the inner frame of the second upper elastic member 150b may be longer than the distance between the one end of the inner frame of the first upper elastic member 150a and the other end of the inner frame of the second upper elastic member 150b.

The first outer connector Q1 may be positioned at one end of the outer frame 152 of the first upper elastic member 150a, and the second outer connector Q2 may be positioned at one end of the outer frame 152 of the second upper elastic member 150b. As illustrated in FIG. 5, the distance between the one end of the outer frame of the first upper elastic member 150a and the one end of the outer frame of the second upper elastic member 150b may be shorter than the distance between the one end of the outer frame of the first upper elastic member 150a and the other end of the outer frame of the second upper elastic member 150b.

In another embodiment, the distance between the one end of the outer frame of the first upper elastic member 150a and the one end of the outer frame of the second upper elastic member 150b may be longer than the distance between the one end of the outer frame of the first upper elastic member 150a and the other end of the outer frame of the second upper elastic member 150b.

Each of the first and second upper elastic members 150a and 150b may have a first through hole 151a or recess 151a, which is formed in the inner frame 151 and is coupled to the upper support protrusion 113 of the bobbin 110, and a second through hole 152a or recess, which is formed in the outer frame 152 and is coupled to the upper frame support protrusion 144 of the housing 140.

Similarly, each of the first and second lower elastic members 160a and 160b may have therein a third through hole 161a or recess, which is formed in the inner frame 161 and is coupled to the lower support protrusion of the bobbin 110, and a fourth through hole 162a or recess, which is formed in the outer frame 162 and is coupled to the lower frame support protrusion of the housing 140.

Bonding between the upper and lower elastic members 150 and 160 and the bobbin 110 and bonding between the upper and lower elastic members 150 and 160 and the housing 140 may be implemented using, for example, thermal fusion and/or adhesive.

Next, the circuit board 250 will be described.

The circuit board 250 may be disposed at, coupled to or mounted on the housing 140, and may be conductively connected to at least one of the upper and lower elastic members 150 and 160. The circuit board 250 may be a printed circuit board, for example, an FPCB, a PCB or a ceramic board.

In an example, the circuit board 250 may be secured to, supported by or disposed on one of four side walls 140a to 140d (for example, 140c) of the housing 140 without being limited thereto. In another embodiment, the circuit board 250 may be supported by the upper surface of the housing 140.

The circuit board 250 may include a plurality of terminals 251 so as to receive a driving signal from the outside and to supply the driving signal to the first coil 120.

The circuit board 250 may receive a voltage, which is induced to the second coil 170 by electromotive force resulting from inductive interaction between the first coil 120 and the second coil 170.

For example, the circuit board 250 may include two terminals 251-1 and 251-2 for supplying a first voltage (for example, + voltage) and a second voltage (for example, − voltage) to the first coil 120, and two terminals 251-3 and 251-4 for receiving the voltage induced from the second coil 170.

Figure 7A:
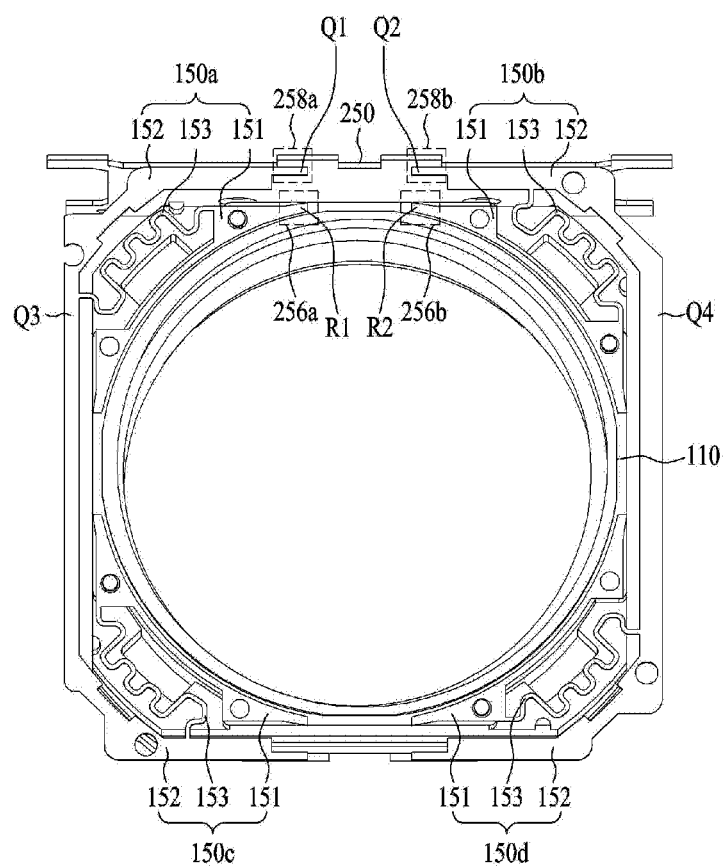
FIG. 7A illustrates the conductive connection between the first circuit board and the upper elastic member, shown in FIG. 1, and the conductive connection between a first coil and the upper elastic member, shown in FIG. 1.

FIG. 7A illustrates the conductive connection between the first circuit board 250 and the upper elastic member 150, shown in FIG. 1, and the conductive connection between the first coil 120 and the upper elastic member 150, shown in FIG. 1.

Referring to FIG. 7A, the first inner connector R1 of the first upper elastic member 150a may constitute a conductive connection 256a along with an end of the first coil 120, and the first outer connector Q1 of the first upper elastic member 150a may constitute a conductive connection 258a along with the circuit board 250.

The second inner connector R2 of the second upper elastic member 150b may constitute a conductive connection 256b to the other end of the first coil 120, and the second outer connector Q2 of the second upper elastic member 150b may constitute a conductive connection 258b to the circuit board 250.

Figure 7B:
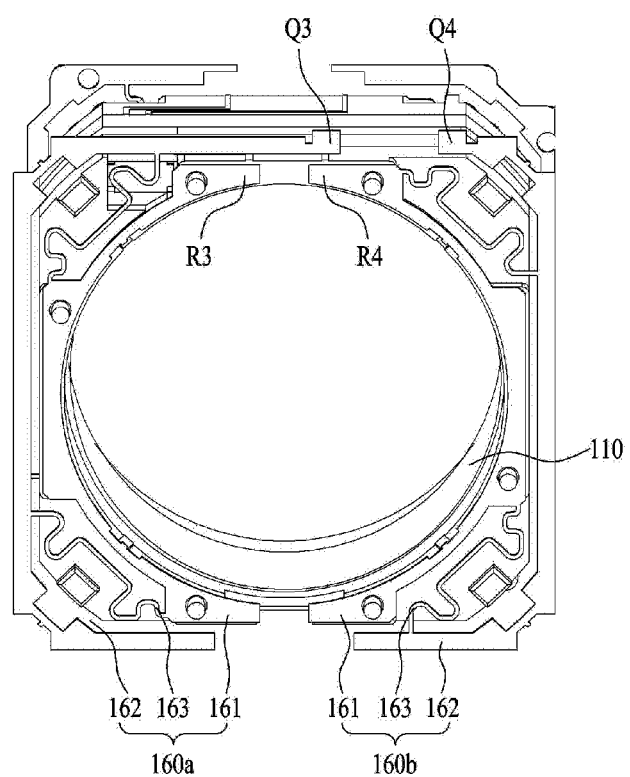
FIG. 7B illustrates the conductive connection between the lower elastic member and a second coil, shown in FIG. 1.

FIG. 7B illustrates the conductive connection between the lower elastic member 160 and the second coil 170, shown in FIG. 1.

Referring to FIG. 7B, the third inner connector R3 of the first lower elastic member 160a may constitute a conductive connection (not shown) to one end of the second coil 170, and the third outer connector Q3 of the first lower elastic member 160a may constitute a conductive connection (not shown) to the circuit board 250.

The fourth inner connector R4 of the second lower elastic member 160b may constitute a conductive connection 257b to the other end of the second coil 170, and the fourth outer connector Q4 of the second lower elastic member 160b may constitute a conductive connection to the circuit board 250.

The first voltage (for example, + voltage) and the second voltage (for example, − voltage), which are supplied to the circuit board 250, may be applied to the first coil 120 through the conductive connections 256a and 256b, 258a and 258b.

The voltage induced to the second coil 170 may be supplied to the circuit board 250 through the conductive connections between the second coil 170 and the first and second lower elastic members 160a and 160b and the conductive connections between the first and second lower elastic members 160a and 160b and the circuit board 250.

Next, the base 210 and the second coil 170 will be described.

The base 210 may be coupled to the cover member 300 so as to define a space for accommodating the bobbin 110 and the housing 140 therein. The base 210 may have a bore, which corresponds to the bore of the bobbin 110 and/or the bore of the housing 140, and may be configured to have a shape, for example, a rectangular shape, which coincides with or corresponds to the cover member 300.

The base 210 may include a stepped portion 211 (see FIG. 2), to which an adhesive is applied when the base is adhesively secured to the cover member 300. The stepped portion 211 may guide the coupling of a cover member 300 thereto, and may be coupled to the end of the cover member 300 in a surface-contact manner.

The base 210 may include guide members 216, which protrude upward in the vertical direction from four corners thereof by a predetermined height. The guide members 216 may be configured to have a polygonal column shape without being limited thereto. The guide members 216 may be fitted in, fastened to or coupled to the lower guide recesses 148 of the housing 140.

The second coils 170 may be placed on the upper surface of the base 210 so as to be spaced apart from the first coil 120 in the first direction. For example, the second coil 170 may be disposed between the lower elastic member 160 and the base 210. The base 210 may be provided in the upper surface thereof with a groove 212 (see FIG. 8), into which the second coil 170 is fitted, mounted and secured. In another embodiment, the second coil 170 may be mounted on the lower surface of the base 210, or may be fitted into a groove formed in the lower surface of the base 210.

The second coil 170 may be wound clockwise or counterclockwise about the optical axis without being limited thereto. The second coil 170 may correspond to the first coil 120 or may be aligned with the first coil 120 without being limited thereto.

Although the second coil 170 is shown in FIG. 1 as having a ring shape, the disclosure is not limited thereto. The second coil 170 may be embodied to take the form of a PCB or an FP coil.

Figure 20A:
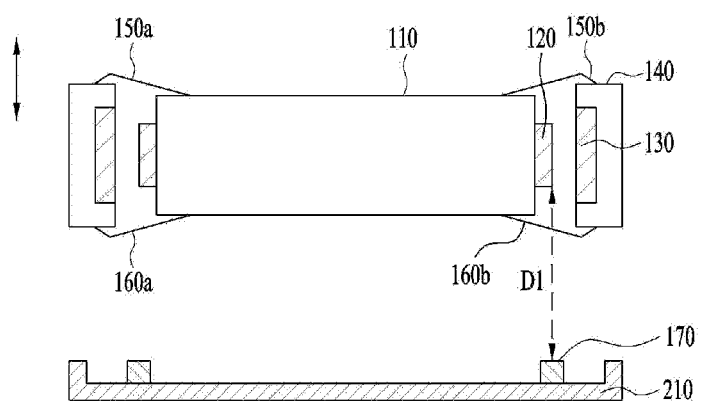
FIG. 20A is a schematic view illustrating the bobbin, the first coil, the magnet, the housing and the second coil, which are shown in FIG. 1, explaining the application of voltage to the second coil.
Figure 20B:
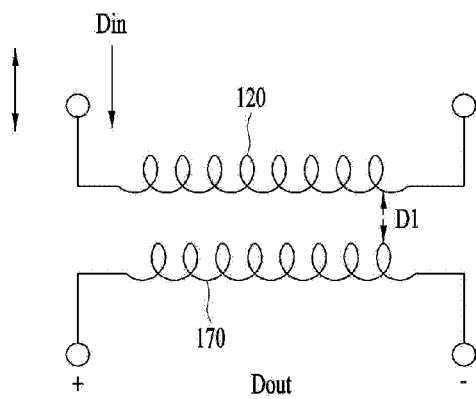
FIG. 20B is a schematic view explaining the inductive interaction between the first coil and the second coil.

FIG. 20A is a schematic view illustrating the bobbin 110, the first coil 120, the magnet 130, the housing 140 and the second coil 170, which are shown in FIG. 1, for explaining the application of a voltage to the second coil 170. FIG. 20B is a schematic view explaining the inductive interaction between the first coil 120 and the second coil 170.

Referring to FIGS. 20A and 20B, a driving signal Din, which is applied to the first coil 120, may be an AC signal, for example, a sine wave signal or a pulse signal (for example, a pulse width modulation (PWM) signal). In another embodiment, the driving signal Din, which is applied to the first coil 120, may include an AC signal and a DC signal. The application of an AC signal is intended to induce an electromotive force or a voltage to the second coil 170 via the inductive interaction.

In response to the driving signal Din, the first coil 120 may be moved in the first direction along with the bobbin 110 by an electromagnetic force resulting from the electromagnetic interaction between the current flowing through the first coil 120 and the magnet 130.

As the first coil 120 moves in the first direction, the distance D1 between the first coil 120 and the second coil 170 varies, thereby inducing a voltage Dout to the second coil 170. For example, as the distance D1 is reduced, the voltage applied to the second coil 170 may be increased. In contrast, as the distance D1 is increased, the voltage applied to the second coil 170 may be reduced.

Based on the voltage applied to the second coil 170, displacement of the first coil 120 may be detected, and the driving signal supplied to the first coil 120 may be controlled.

In order to inhibit noise, for example, PWM noise, from being transmitted to an image sensor mounted on the camera module, the lens moving apparatus 100 may further include a blocking member 180 (see FIG. 8), which is provided under the second coil 170 so as to block an electromagnetic field. However, another embodiment may not include an additional blocking member.

Figure 8:
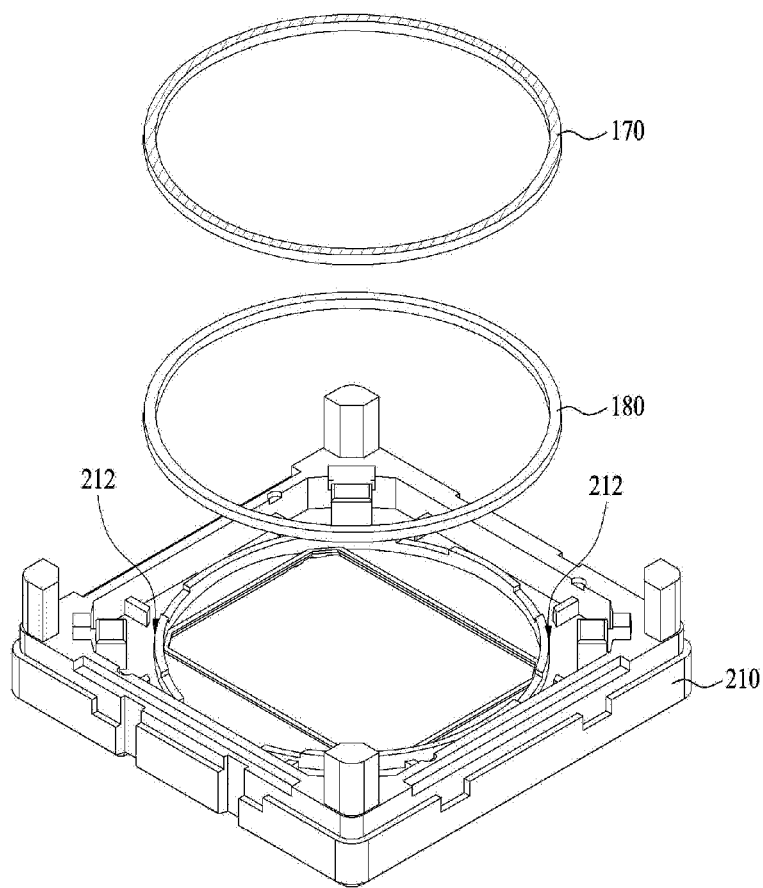
FIG. 8 is a view illustrating the second coil and a blocking member, which are mounted on a base.

FIG. 8 illustrates the second coil 170 and the blocking member 180, which are mounted on the base 210.

Referring to FIG. 8, the blocking member 180 may be disposed in the groove 212 in the base 210, and the second coil 170 may be placed on the blocking member 180 fitted in the groove 212 in the base 210. For example, the blocking member 180 may be disposed between the base 210 and the second coil 170. The blocking member 180 may be made of metal containing a Fe component.

Figure 9:
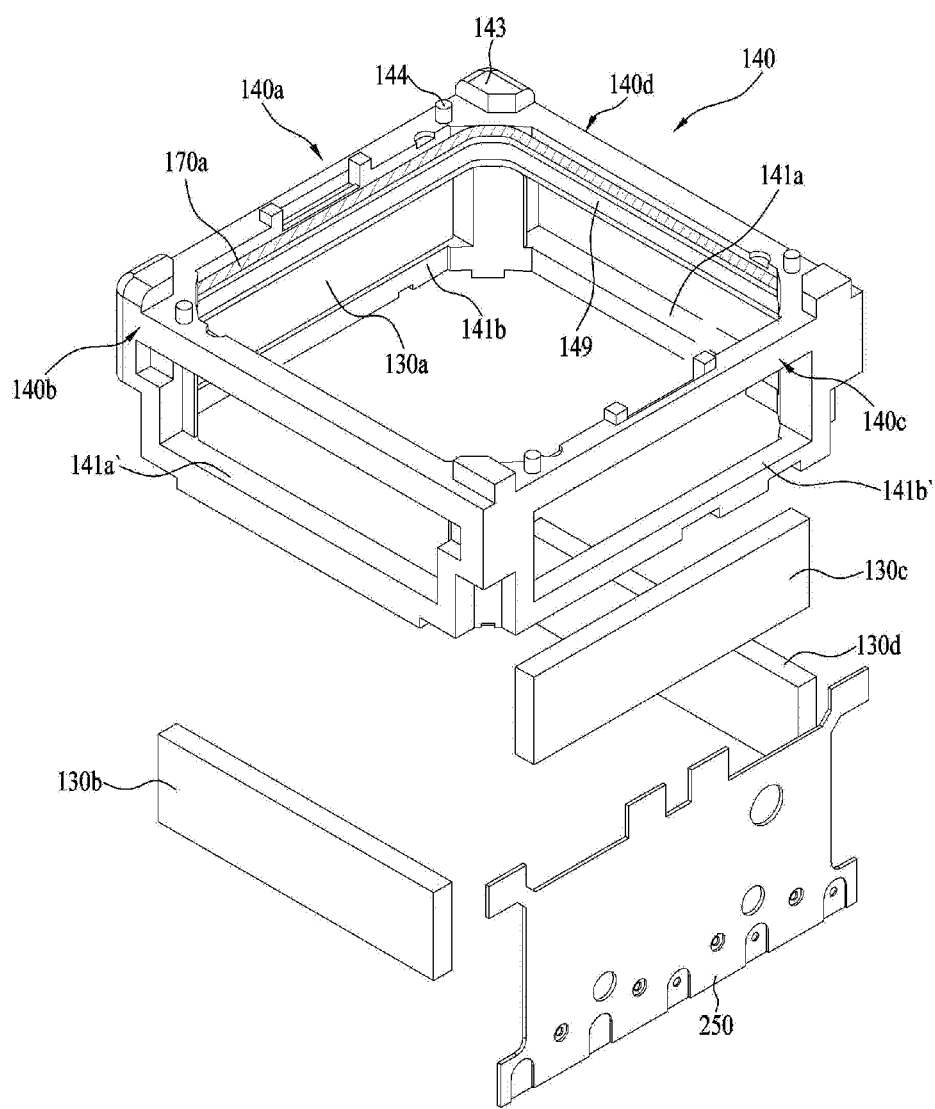
FIG. 9 is a view illustrating the disposition of a second coil according to another embodiment.

FIG. 9 illustrates the disposition of a second coil 170a according to another embodiment.

Referring to FIG. 9, the second coil 170a may be disposed on the housing 140, unlike the configuration shown in FIG. 8. For example, the second coil 170a may be disposed on the upper end of the housing 140 so as to be spaced apart from the upper elastic member 150. Specifically, the second coil 170a, which is disposed on the upper end of the housing 140, may be positioned above the first coil 120 but under the upper elastic member 150.

The side walls 140a to 140d of the housing 140 may include a support portion 149 supporting the second coil 170a. The support portion 149 may be positioned on the inner surface of the side walls 140a to 140d of the housing 140.

Although FIG. 9 illustrates the second coil 170a, which is disposed on the inner surfaces of the side walls 140a to 140d of the housing 140, the disclosure is not limited thereto.

In a further embodiment, the second coil 170 may be disposed on the upper surface or the outer circumferential surface of the side walls 140a to 140d of the housing 140.

Since the second coil 170 is disposed on the upper surface or the side walls 140a to 140d of the housing 140, the second coil 170 may be disposed at higher level than the first coil 120, which is mounted on the outer circumferential surface of the bobbin 110.

Since the second coil 170 is disposed on the upper surface of the housing 140 or the upper ends of the side walls 140a to 140d, it is possible to increase the distance between the second coil 170 and the image sensor of the camera module compared to the embodiment shown in FIG. 8. In the embodiment shown in FIG. 9, since the distance between the second coil 170 and the image sensor of the camera module is increased, it is possible to suppress the transmission of PWM noise to the image sensor. Accordingly, the blocking member 180 shown in FIG. 8 may be omitted in the case where the second coil 170 is disposed on the upper surface of the housing 140 or the upper end of the side walls 140a to 140d.

The second coil 170 may overlap the first coil 120 in the first direction. The distance between the vertical line and the first coil 120 may be the same as the distance between the vertical line and the second coil 170. Here, the vertical line may be a line that is parallel to the optical axis or is parallel to the first direction, which is parallel to the optical axis and which extends through the center of the second coil 170, the center of the bobbin 110 and/or the center of the housing 140.

In another embodiment, the distance between the vertical line and the first coil 120 may be longer than the distance between the vertical line and the second coil 170.

In a further embodiment, the distance between the vertical line and the first coil 120 may be shorter than the distance between the vertical line and the second coil 170.

Figure 10:
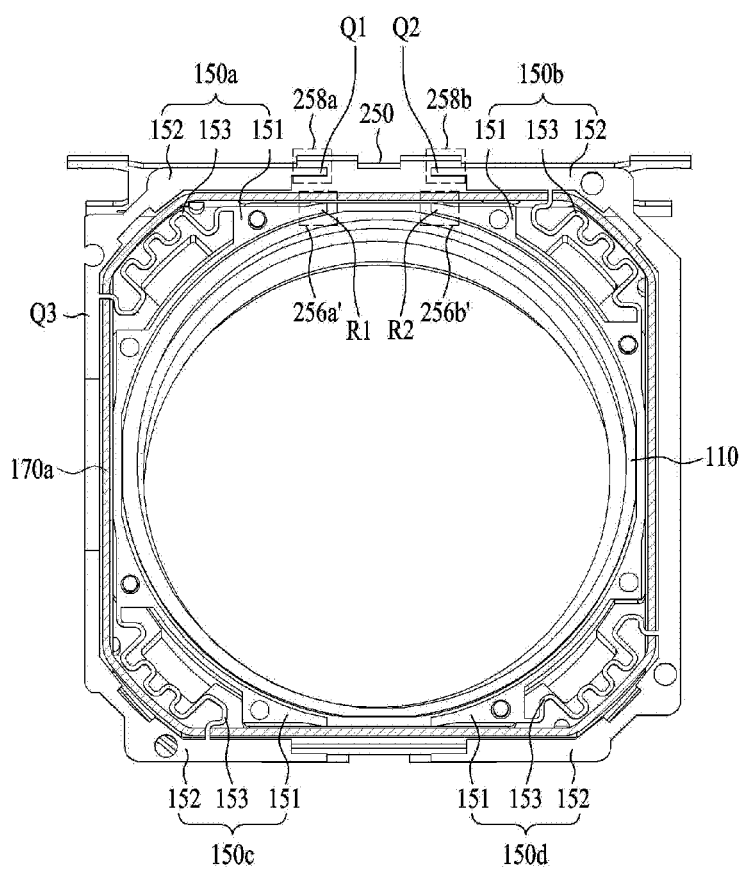
FIG. 10 a view illustrating the conductive connection between the second coil and the first and second upper elastic members, shown in FIG. 9.

FIG. 10 illustrates the conductive connection between the second coil 170a and the first and second upper elastic members 150a and 150b, shown in FIG. 9.

Referring to FIG. 10, one end of the second coil 170a (for example, the starting end of the second coil 170a) may be conductively connected to the first inner connector R1 of the first upper elastic member 150a. The other end of the second coil 170a (for example, the terminating end of the second coil 170a) may be conductively connected to the second inner connector R2 of the second upper elastic member 150b.

A conductive connection 256a' may be formed between the first inner connector R1 and the one end of the second coil 170a, and a conductive connection 256b' may be formed between the second inner connector R2 and the other end of the second coil 170a.

The conductive connection between the circuit board 250 and the first and second outer connectors Q1 and Q2 of the first and second upper elastic members 150a and 150b may be implemented in the same manner as the embodiment illustrated in FIG. 7A.

One end of the first coil 120 may be conductively connected to the third inner connector R3 of the first lower elastic member 160a, and the other end of the second coil 120 may be conductively connected to the fourth inner connector R4 of the second lower elastic member 160*b*.

The conductive connection between the circuit board 250 and the third and fourth outer connectors Q3 and Q4 of the first and second lower elastic members 160*a* and 160*b* may be implemented in the same manner as the embodiment illustrated in FIG. 7B.

With the exception of the details described with reference to FIGS. 9 and 10, the details described in the embodiment shown in FIG. 1 may be equally applied to the embodiment shown in FIGS. 9 and 10.

In another embodiment, the lens moving apparatus may include the components shown in FIG. 1 but may not include the circuit board 250. The upper elastic member 150 may not be divided, and only the lower elastic member 160 may be divided into two segments. The base 210 may be provided with four terminal pins. Among the four terminal pins, two terminal pins may be conductively connected to the outer frames of the lower elastic members 160*a* and 160*b*, and the first coil 120 may be conductively connected to the inner frames of the lower elastic members 160*a* and 160*b*.

The remaining two terminal pins may be conductively connected to two ends of the second coil 170. Consequently, driving power may be supplied to the first coil 120 through two of the four terminal pins provided at the base 210 and through the lower elastic members 160*a* and 160*b*, and the voltage applied to the second coil 170 may be output through the remaining two of the four terminal pins. Here, all the four terminal pins may be disposed on one side of the upper surface of the base 210 or on one side surface of the base 210.

Alternatively, in another embodiment, the two terminal pins connected to the lower elastic members 160*a* and 160*b* may be disposed on a first side of the upper surface of the base 210 or a first side surface of the base 210, and the two terminal pins connected to the second coil 170 may be disposed on a second side of the upper surface of the base 210 or a second side surface of the base 210. The first and second sides of the upper surface of the base 210 may be opposite to each other or perpendicular to each other. The first and second side surfaces of the base 210 may be opposite to each other or perpendicular to each other.

In a further embodiment, the lens moving apparatus may include the components shown in FIG. 1 but may not include the circuit board 250. The upper elastic member 150 may not be divided, and only the lower elastic member 160 may be divided into two segments. The base 210 may be provided with two terminal pins. The two terminal pins may be conductively connected to two ends of the second coil 170. The first coil 120 may be conductively connected to the inner frames of the lower elastic members 160*a* and 160*b*. The outer frame of each of the lower elastic members 160*a* and 160*b* may partially extend, and may have a bent portion functioning as a terminal pin.

Figure 11:
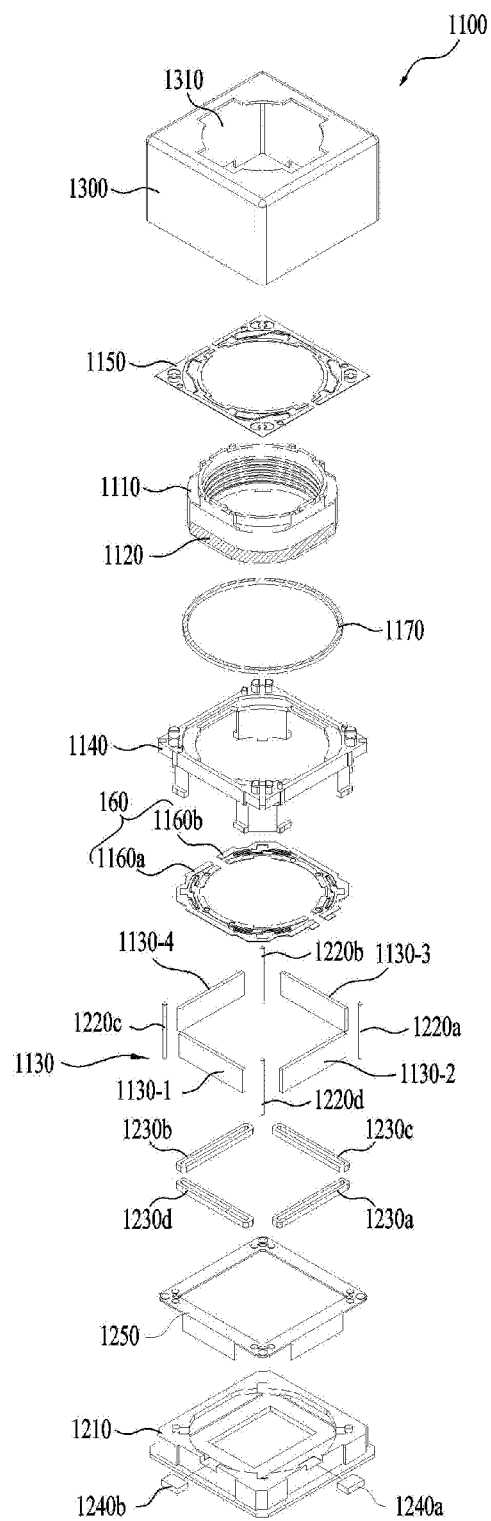
FIG. 11 is an exploded perspective view of a lens moving apparatus according to another embodiment.
Figure 12:
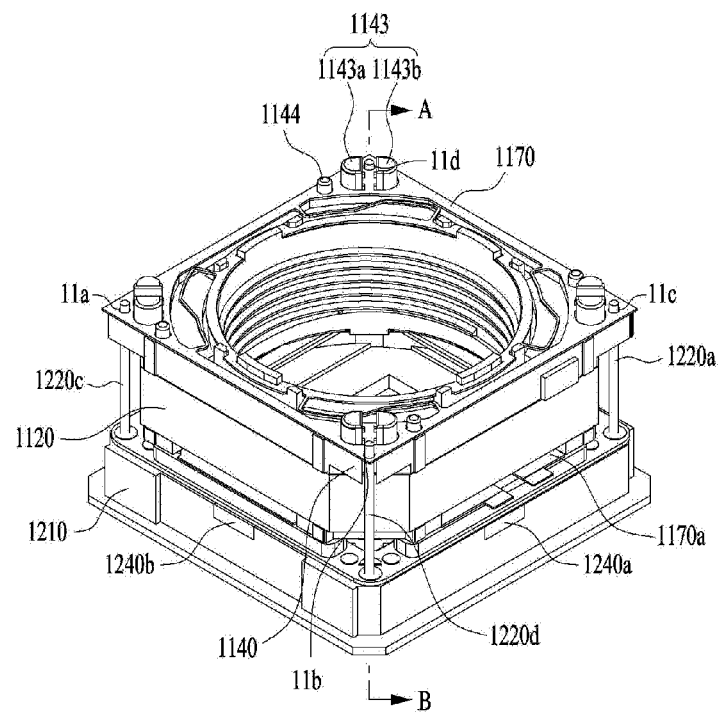
FIG. 12 is an assembled perspective view of the lens moving apparatus, from which the cover member shown in FIG. 11 has been removed.
Figure 18:
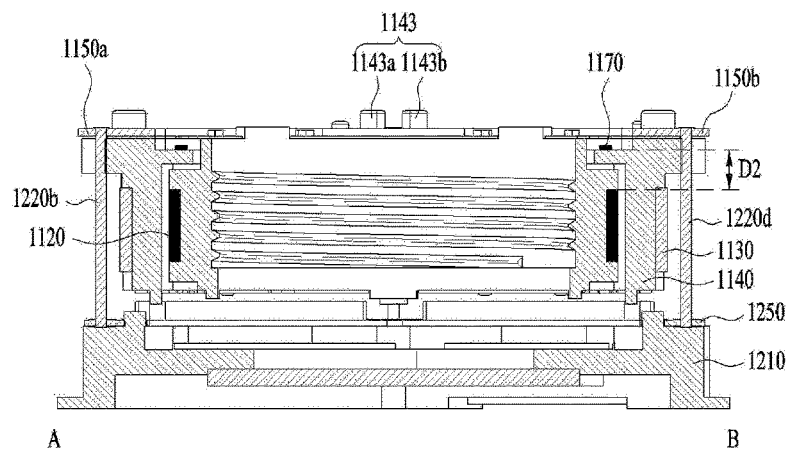
FIG. 18 is a cross-sectional view of the lens moving apparatus, which is taken along line A-B in FIG. 12.

FIG. 11 is an exploded perspective view of a lens moving apparatus 1100 according to another embodiment. FIG. 12 is an assembled perspective view of the lens moving apparatus 1100, from which a cover member 1300 shown in FIG. 11 is removed. FIG. 18 is a cross-sectional view of the lens moving apparatus, which is taken along line A-B in FIG. 12.

Referring to FIGS. 11 and 12, the lens moving apparatus 1100 includes a cover member 1300, an upper elastic member 1150, a bobbin 1110, a first coil 1120, a housing 1140, a magnet 1130, a lower elastic member 1160, elastic support members 1220*a* to 1220*d*, a second coil 1170, a third coil 1230, a circuit board 1250, a base 1210 and first and second position sensors 240*a* and 240*b*.

The description regarding the cover member 1300 shown in FIG. 1 may be equally applied to the cover member 1300.

Figure 13:
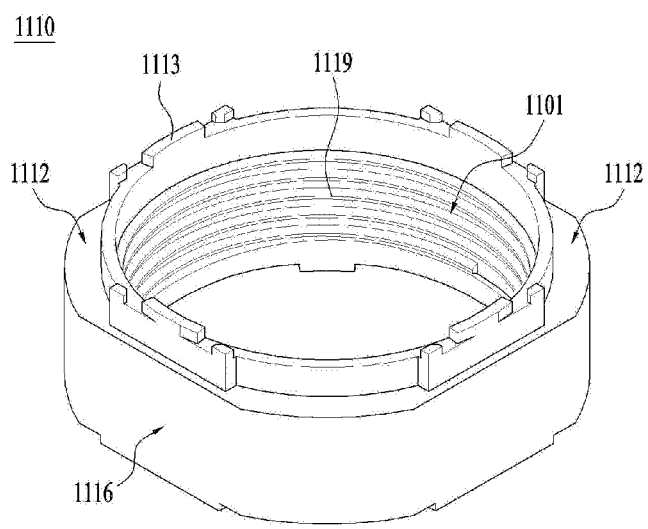
FIG. 13 is a first perspective view of the bobbin shown in FIG. 11.
Figure 14:
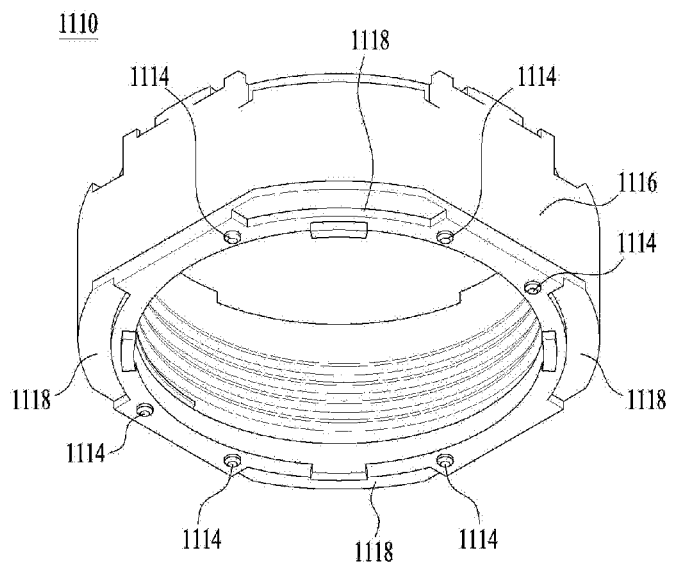
FIG. 14 is a second perspective view of the bobbin shown in FIG. 11.

FIG. 13 is a first perspective view of the bobbin 1110 shown in FIG. 11. FIG. 14 is a second perspective view of the bobbin 1110 shown in FIG. 11.

Referring to FIGS. 13 and 14, the bobbin 1110 may include a bore for mounting a lens or a lens barrel, an upper support protrusion 1113 for enabling the bobbin 1110 to be coupled to the upper elastic member 1150, and a lower support protrusion 1114 for enabling the bobbin 1110 to be coupled to the lower elastic member 1160.

The bobbin 1110 may further include an upper avoidance recess 1112 for avoiding spatial interference with a connection portion 1153 of the upper elastic member 1150, and a lower avoidance recess 1119 for avoiding spatial interference with a connection portion 1163 of the lower elastic member 1160.

Although the bobbin 1110 has a shape that is different from that of the bobbin 110 shown in FIG. 1, the bobbin 1110 may fulfill the same function as the bobbin 110, and the description regarding the bobbin 110 may thus be equally applied to the bobbin 1110.

The first coil 1120 is disposed on the outer circumferential surface of the bobbin 1110. A driving signal may be applied to the first coil 1120. The description regarding the first coil 1120 shown in FIG. 1 may be equally applied to the first coil 1120.

Figure 15:
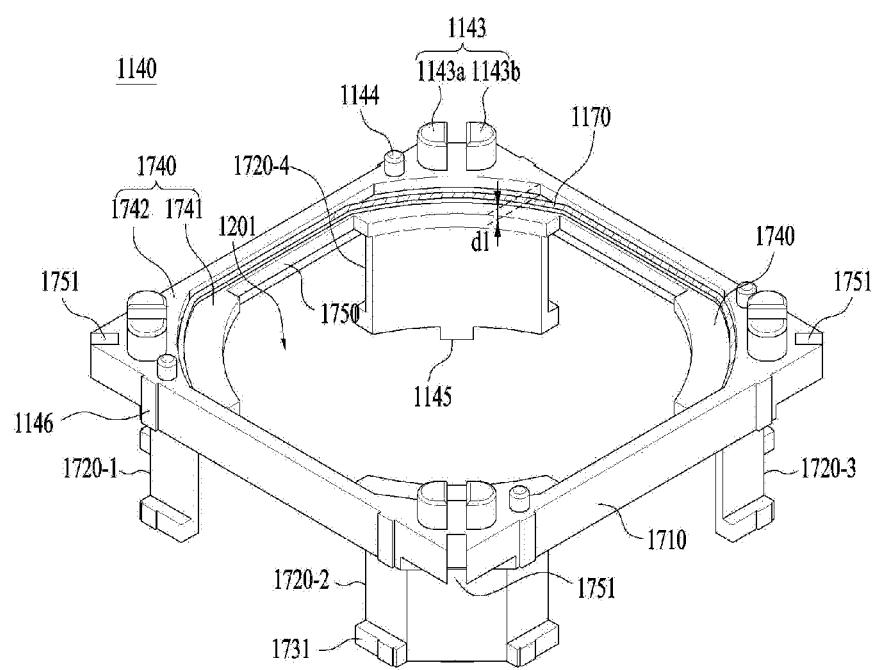
FIG. 15 is a first perspective view illustrating the housing and the second coil, which are shown in FIG. 11.
Figure 16:
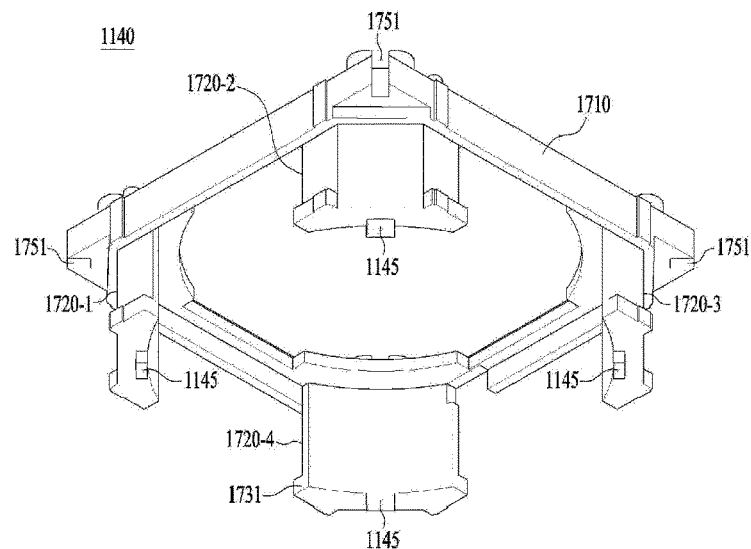
FIG. 16 is a second perspective view illustrating the housing shown in FIG. 11.

FIG. 15 is a first perspective view illustrating the housing 1140 and the second coil 1170, which are shown in FIG. 11. FIG. 16 is a second perspective view illustrating the housing 1140 shown in FIG. 11.

Referring to FIGS. 15 and 16, the housing 1140 may support the magnet 1130, and may accommodate the bobbin 1110 therein in a manner of allowing the bobbin 1110 to be moved in the first direction.

The housing 1140 may include an upper end portion 1710 having a bore therein, and a plurality of support portions 1720-1 to 1720-4 connected to the lower surface of the upper end portion 1710.

The support portions 1720-1 to 1720-4 of the housing 1140 may be spaced apart from each other, and may be configured to have a prismatic column shape without being limited thereto. The housing 1140 may include four support portions 1720-1 to 1720-4, and at least one pair of support portions among the support portions 1720-1 to 1720-4 may be disposed to be opposite to each other.

In an example, the support portions 1720-1 to 1720-4 of the housing 1140 may be disposed to correspond to the avoidance recesses 1112 and 1118 of the bobbin 1110. In another example, the support portions 1720-1 to 1720-4 of the housing 1140 may be disposed to respectively correspond to or to be respectively aligned with four corners of the upper end portion 1710.

The support portions 1720-1 to 1720-4 of the housing 1140 may be provided with respective stepped portions 1731 so as to support the magnet 1130.

In order to inhibit collisions with the cover member 1300, the housing may be provided with at least one first stopper 1143, which protrudes from the upper surface of the housing 1140. The first stopper 1143 of the housing 1140 may function to guide the installation position of the upper elastic member 1150.

In order to inhibit collisions with the cover member 1300, the housing 1140 may be provided with at least one second stopper 1146, which protrudes from a side surface of the upper end portion 1710.

The housing may include at least one upper frame support protrusion 1144, which protrudes from the upper end portion 1710 for coupling to the outer frame 1152 of the upper elastic member 1150, and at least one lower frame support protrusion 1145, which protrudes from the lower surfaces of the support portions 1720-1 to 1720-4 for coupling to the outer frame 1162 of the lower elastic member 1160.

The upper end portion 1710 of the housing 1140 may include a second coil support portion 1741, which projects into the bore 1201 and is positioned to be lower than the upper surface by a height difference dl. The second coil 1170 may be disposed or mounted on the second coil support portion 1741.

For example, the upper surface 1740 of the upper end portion 1710 of the housing 1140 may include the second coil support portion 1741 and an outer support portion 1742, and a height difference dl in the first direction may be present between the second coil support portion 1741 and the outer support portion 1742.

The outer support portion 1742 may abut the outer surface of the housing 1140, and may be configured to have a shape corresponding to or coinciding with the outer frame 1152 of the upper elastic member 1150 so as to support the outer frame 1152 of the upper elastic member 1150.

The second coil support portion 1741 may have the form of a recess or cavity, which is recessed from the outer support portion 1742, and may be configured to have a height difference dl in the first direction with respect to the outer support portion 1742.

In order to inhibit oscillation while the bobbin 1110 moves, a damper may be applied between the second coil support portion 1741 and the connection portion 1153 of the upper elastic member 1150.

The housing 1140 may have slots 1751 formed in the corners of the side surfaces of the upper end portion 1710 so as to allow the elastic support members 1220a to 1220d to extend through the slots 1751.

The slots 1751 of the housing may be configured to have the form of a groove, which is recessed in the second and/or third direction from the corners of the side surfaces, without being limited thereto. In another embodiment, the slots 1751 may be configured to have the form of a hole, which is formed from the upper surface to the lower surface of the upper end portion 1710 of the housing 1140.

Although the depth of the slots 1751 in the housing 1140 may be greater than the thickness of the elastic support members 1220a to 1220d, the disclosure is not limited thereto. The slots 1751 of the housing 1140 may function to guide or support the elastic support members 1220a to 1220d.

The second coil 1170 may be placed on the upper surface of the housing 1400. For example, the second coil 1170 may be disposed, seated or mounted on the second coil support portion 1741 of the upper end portion 1710 of the housing 1140.

The second coil 1170 may fulfill the same function as the second coil 170 shown in FIG. 1, and the description regarding the second coil 170 shown in FIG. 1 may be equally applied to the second coil 1170.

The second coil 1170 may overlap the first coil 1120 in the first direction. The distance between the vertical line and the first coil 1120 may be the same as the distance between the vertical line and the second coil 1170. Here, the vertical line may be a line that is parallel to the optical axis or is parallel to the first direction, which is parallel to the optical axis, and may extend through the center of the second coil 1170, the center of the bobbin 1110 and/or the center of the housing 1140.

In another embodiment, the distance between the vertical line and the first coil 1120 may be longer than the distance between the vertical line and the second coil 1170.

In a further embodiment, the distance between the vertical line and the first coil 1120 may be shorter than the distance between the vertical line and the second coil 1170.

The magnet 1130 may be disposed on the outer circumferential surface of the housing 1140 so as to correspond to or to be aligned with the first coil 1120. For example, the magnet 1130 may be disposed on the support portions 1720-1 to 1720-4 of the housing 1140 using adhesive or double-sided adhesive tape.

The magnet 1130 may fulfill the same function as the magnet 130 shown in FIG. 1, and the description regarding the magnet 130 shown in FIG. 1 may be equally applied to the magnet 1130.

Figure 17:
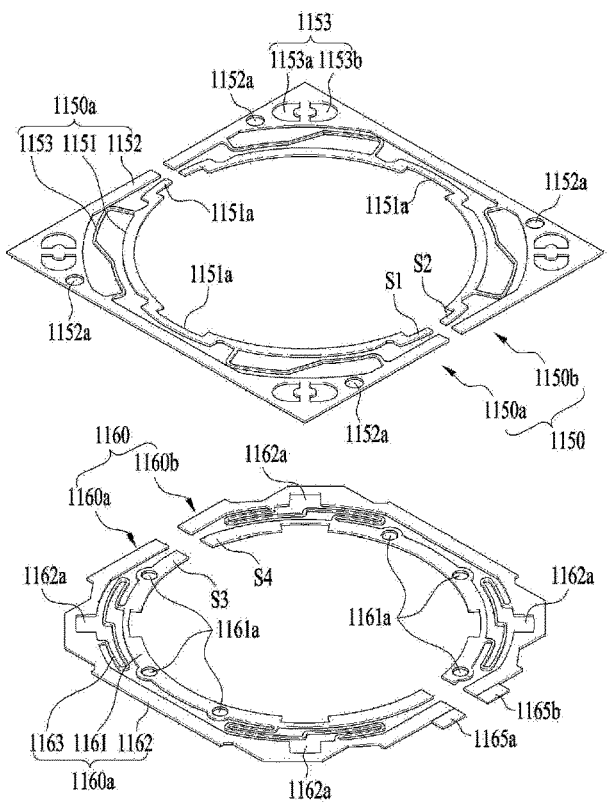
FIG. 17 is a perspective view illustrating the upper elastic member and the lower elastic member, which are shown in FIG. 11.

FIG. 17 is a perspective view illustrating the upper elastic member 1150 and the lower elastic member 1160, which are shown in FIG. 11.

Referring to FIG. 17, each of the upper elastic member 1150 and the lower elastic member 1160 may be divided into two or more segments.

For example, the upper elastic member 1150 may include first and second upper elastic members 1150a and 1150b, which are conductively separated from each other, and the lower elastic member 1160 may include first and second lower elastic members 1160a and 1160b.

Each of the first and second upper elastic members 1150a and 1150b and each of the first and second lower elastic members 1160a and 1160b may include inner frames 1151 and 1161 coupled to the bobbin 1110, outer frames 1152 and 1162 coupled to the housing 1140, and connection portions 1153 and 1163 connecting the inner frames 1151 and 1161 to the outer frames 1152 and 1162.

The inner frame 1151 of the upper elastic member 1150 may be provided with a bent portion 1151a, which is fitted over the upper support protrusion 1113 of the bobbin 1110.

The outer frame 1152 of the upper elastic member 1150 may be provided with a first through hole 1152a, which is coupled to the upper frame support protrusion 1144 of the housing 1140. The outer frame 1152 of the upper elastic member 1150 may be provided with a first guide hole 1153, which is coupled to the first stopper 1143 of the housing 1140.

The inner frame 1161 of the lower elastic member 1160 may be provided with a third through hole 1161a, which is coupled to the lower support protrusion of the bobbin 1110. The outer frame 1162 of the lower elastic member 1160 may be provided with an insertion cutout 1162a, which is coupled to the lower frame support protrusion 1145 of the housing 1140.

The upper elastic member 1150 may be conductively connected to the second coil 1170.

One end of the second coil 1170 (for example, the starting end of the second coil 1170) may be conductively connected to the first upper elastic member 1150a through soldering or thermal fusion, and the other end of the second coil 1170 (for example, the terminating end of the second coil 1170) may be conductively connected to the second upper elastic member 1150b through soldering or thermal fusion.

The inner frame 1151 of the first upper elastic member 1150a may include a first inner connector S1, and the inner frame 1151 of the second upper elastic member 1150b may include a second inner connector S2.

One end of the second coil 1170 may be conductively connected to the first inner connector S1 of the first upper elastic member 1150a, and the other end of the second coil 1170 may be conductively connected to the second inner connector S2 of the second upper elastic member 1150b.

The upper elastic member 1150 may be conductively connected to the circuit board 1250 via the elastic support portions 1220a to 1220d.

One end of at least one of the elastic support members 1220a to 1220d may be conductively connected to the outer frame 1152 of the first upper elastic member 1150a, and the other end of the at least one of the elastic support members 1220a to 1220d may be conductively connected to a corresponding one of the terminals provided on the terminal surface 1250a of the circuit board 1250.

One end of at least another one of the elastic support members 1220a to 1220d may be conductively connected to the outer frame 1152 of the second upper elastic member 1150b, and the other end of the at least another one thereof may be conductively connected to a corresponding one of the terminals provided on the terminal surface 1250a of the circuit board 1250.

The lower elastic member 1160 may be conductively connected to the first coil 1120.

One end of the first coil 1120 (for example, the starting end of the first coil 1120) may be conductively connected to the first lower elastic member 1160a through soldering or thermal fusion, and the other end of the first coil 1120 (for example, the terminating end of the first coil 1120) may be conductively connected to the second lower elastic member 1160b through soldering or thermal fusion.

The inner frame 1161 of the first lower elastic member 1160a may include a third inner connector S3, and the inner frame 1161 of the second lower elastic member 1160b may include a fourth inner connector S4.

One end of the first coil 1120 may be conductively connected to the third inner connector S3 of the first lower elastic member 1160a, and the other end of the first coil 1120 may be conductively connected to the fourth inner connector S4 of the second lower elastic member 1160b.

The lower elastic member 1160 may be conductively connected to the circuit board 1250. For example, the outer frames 1162 of the first and second lower elastic members 1160a and 1160b may include pad portions 1165a and 1165b.

Each of the pad portions 1165a and 1165b of the first and second lower elastic members 1160a and 1160b may be conductively connected to a corresponding one of the terminals provided on the terminal surface 1250a of the circuit board 1250.

A driving signal may be supplied to the first coil 1120 from the circuit board 250 through the first and second lower elastic members 1160a and 1160b. Here, the driving signal may be the same as the driving signal applied to the first coil 120 shown in FIG. 1.

A voltage, which is induced to the second coil 1170, may be supplied to the circuit board 1250 through the first and second upper elastic members 1150a and 1150b and two selected from among the elastic support members 220 to 220d.

In another embodiment, the lower elastic member 1160 may not be divided, but the upper elastic member 1150 may be divided into four segments. Accordingly, a driving signal may be supplied to the first coil 1120 from the circuit board 1250 through two selected from among the four divided upper elastic members and two selected from among the elastic support members 220a to 220d. A voltage, which is induced to the second coil 1170, may be supplied to the circuit board 1250 through the remaining two of the four divided upper elastic members and the remaining two of the elastic support members 220a to 220d.

Figure 19:
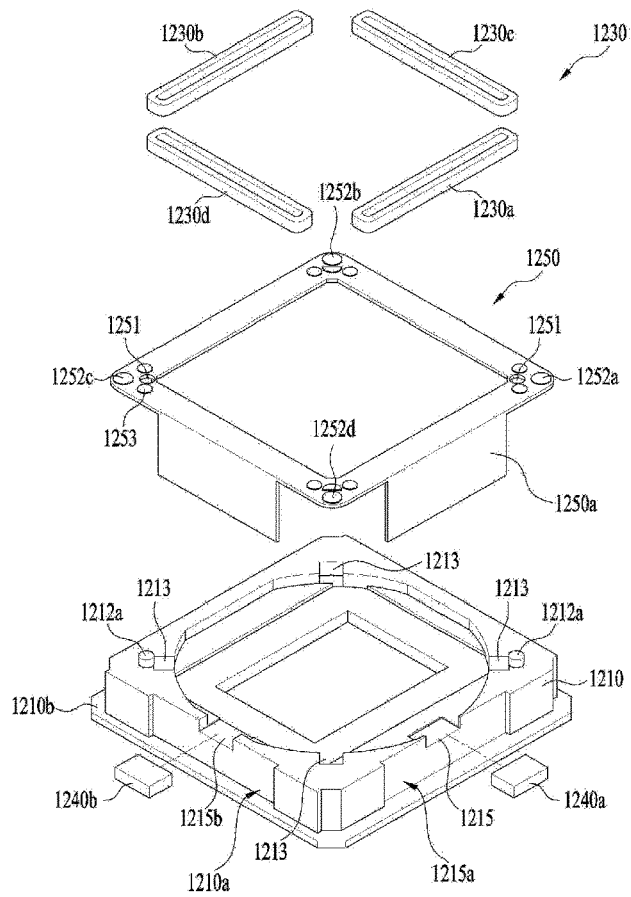
FIG. 19 is an exploded perspective view illustrating the base, the third coil and the circuit board and the first and second position sensors, which are shown in FIG. 11.

FIG. 19 is an exploded perspective view illustrating the base 1210, the circuit board 1250, the third coil 1230 and the first and second position sensors 1240a and 1240b, which are shown in FIG. 11.

Referring to FIG. 19, the base 1210 may include a mounting groove 1213, which is recessed from the upper surface of the base 1210 and to which the lower frame support protrusions 1145 of the support portions 1720-1 to 1720-4 of the housing 1140 are fitted or secured.

The base 1210 may include a terminal surface support recess 1210a, which is recessed inward from the side surface thereof by a predetermined depth and has a shape corresponding to the terminal surface 1250a of the circuit board 1250, so as to support the terminal surface 1250a of the circuit board 1250.

Furthermore, the base 1210 may include a first position sensor mounting recess 1215a, which is recessed from the upper surface thereof and in which the position sensor 1240a is disposed, and a second position sensor mounting recess 1215b, which is recessed from the upper surface thereof and in which the second position sensor 1240b is disposed. For example, an angle defined between the imaginary lines, which are connected from the centers of the first and second position sensor mounting recesses 1215a and 1215b to the center of the base 1210, may be an angle of 90°.

The base 1210 may include a flange 1210b protruding from a lower portion of the outer circumferential surface thereof. The base 1210 may include a coupling protrusion 1212a, which protrudes from the upper surface of the base 1210 so as to secure the circuit board 1250.

The first and second position sensors 1240a and 1240b may be disposed in the position sensor mounting recesses 1215a and 1215b of the base 1210, which is positioned under the circuit board 1250.

When the housing 1140 moves in the second and/or third direction, the first and second position sensors 1240a and 1240b may detect variation in magnetic force generated from the magnet 1130.

For example, the first and second position sensors 1240a and 1240b may be embodied as a Hall sensor alone or as a driver including a Hall sensor. However, this is merely an illustrative example, and the position sensors may be embodied as any sensor as long as it is able to detect a position without using magnetic force.

The first and second position sensors 1240a and 1240b may be conductively connected to the circuit board 1250 through soldering, thermal fusion or the like.

The third coil 1230 may be disposed on the upper surface of the circuit board 1250, and the position sensors 1240a and 1240b may be disposed on the lower surface of the circuit board 1250.

The circuit board 1250 may be disposed on the upper surface of the base 1210, and may have a bore, which corresponds to the bore of the bobbin 1110, the bore of the housing 1140 and/or the bore of the base 1210.

The circuit board 1250 may include at least one terminal surface 1250a, which is bent from the upper surface thereof and which includes a plurality of terminals or pins for receiving electrical signals from the outside or supplying electrical signals to the outside.

The circuit board 1250 may have a fifth through hole 1251, which is coupled to the coupling protrusion 1212a of the base 1210. Furthermore, the circuit board 1250 may include pads 1252*a* to 1252*d* to which the other ends of the elastic support members 1120*a* to 1220*d* are connected. The pads 1252*a* to 1252*d* may be conductively connected to the plurality of terminals provided on the terminal surfaces 1250*a* via a wiring pattern formed on the circuit board 1250.

The terminals of the circuit board 1250 may be conductively connected to the outer frame 1152 of the first and second upper elastic member 1150*a* and 1150*b* via the elastic support members 1220*a* to 1220*d*.

The circuit board 1250 may be a flexible printed circuit board (FPCB), without being limited thereto. The terminals of the circuit board 1250 may also be formed on a surface of a PCB or the base 1210 in a manner of forming a surface electrode.

The circuit board 1250 may include at least one terminal or pad 1253, to which the starting or terminating end of the third coil 1230 is conductively connected.

For example, the circuit board 1250 may include first terminals, to which the starting ends of second-direction third coils 1230*a* and 1230*b* are conductively connected, second terminals, to which the terminating ends of second-direction third coils 1230*a* and 1230*b* are conductively connected, third terminals, to which the starting ends of third-direction third coils 1230*c* and 1230*d* are conductively connected, and fourth terminals, to which the terminating ends of third-direction third coils 1230*c* and 1230*d* are conductively connected.

The third coil 1230 is disposed on the upper surface of the circuit board 1250 so as to correspond to or to be aligned with the magnet 130. The number of third coils 1230 may be one or more, and may be the same as the number of magnets 1130, without being limited thereto.

Although FIG. 19 illustrates four third coils 1230*a* to 1230*d*, which are disposed on the upper surface of the circuit board 1250 so as to be spaced apart from each other, the disclosure is not limited thereto. In another embodiment, the third coil may be embodied as a coil formed on an additional circuit board, rather than on the circuit board 1250.

For example, the third coil 1230 may include second-direction third coils 1230*a* and 1230*b*, which are arranged so as to be parallel to the second direction, and third-direction third coils 1230*c* and 1230*d*, which are arranged so as to be parallel to the third direction.

As described above, the third coil may be conductively connected to the circuit board 1250.

A driving signal is supplied to the third coil 1230, and the housing 1140 is able to be moved in the second and/or third direction, that is, in the x-axis and/or y-axis direction, by the electromagnetic force resulting from the electromagnetic interaction between the magnet 1130 and the third coil 1230, which are disposed so as to be opposite to or aligned with each other. Handshake correction may be implemented by controlling the movement of the housing 1140.

At least one of the elastic support members 1220*a* to 1220*d* conductively connects the upper elastic member 1150 to the circuit board 1250.

For example, one end of each of two selected from among the elastic support members 1220*a* to 1220*d* may be conductively connected to the outer frame of a corresponding one of the first and second upper elastic members 1150*a* and 1150*b*.

Referring to FIG. 12, there are shown connected portions 11*a* to 11*d*, at which first ends of the elastic support members 1220*a* to 1220*d* are connected to the outer frames 1152 of the first and second upper elastic members 1150*a* and 1150*b*.

The other end of each of the two selected elastic support members may be conductively connected to a corresponding one of the pads 1252*a* to 1252*d* of the circuit board 1250.

The elastic support members 1220*a* to 1220*d* may be disposed radially symmetrically with respect to the center of the housing 1140 in the second and/or third direction, which are perpendicular to the first direction. The elastic support members 1220*a* to 1220*d* may serve as a signal channel between the circuit board 250 and the upper elastic member 1150, through which electrical signals are transmitted, and may elastically support the housing 1140 with respect to the base 1210.

The elastic support members 1220*a* to 1220*d* may be constituted separately from the upper elastic member 1150, and may be embodied as a member capable of elastically supporting an object, such as a leaf spring, a coil spring, a suspension wire or the like. In another embodiment, the elastic support members 1220*a* to 1220*d* may be integrally formed with the upper elastic member 1150.

Referring to FIG. 18, the second coil 1170 may be positioned between the first coil 1120 and the upper elastic members 1150*a* and 1150*b*.

In response to a driving signal, the first coil 1120 is able to move in the first direction together with the bobbin 1110 by the electromagnetic force resulting from the electromagnetic interaction between the magnet 1130 and the current flowing through the first coil 1120. Here, the driving signal may be the same as that described with reference to FIGS. 20A and 20B.

As the first coil 1120 moves in the first direction, the distance D2 between the first coil 1120 and the second coil 1170 varies. With the variation of the distance D2, a voltage may be induced to the second coil 1170. Here, the magnitude of voltage, which is induced to the second coil 1170, may be determined depending on the distance D2.

For example, the voltage induced to the second coil 1170 may increase with the decrease of the distance D2. In contrast, the voltage induced to the second coil 1170 may decrease with the increase of the distance D2.

In this way, displacement of the bobbin 1110 may be detected by the magnitude of voltage induced to the second coil 1170. The auto-focusing in the first direction of the bobbin 1110 may be feedback-controlled using the detected displacement of the bobbin 1110.

Generally, since there is a necessity for a position sensor capable of detecting the displacement of a movable AF unit in order to perform AF feedback control, and since there is a necessity for an additional power connecting structure in order to drive the position sensor, the cost of the lens moving apparatus may increase, and difficulties in manufacturing may arise. The movable AF unit may include the bobbin 110 or 1110, and components, which are mounted on the bobbin 110 or 1110 and are moved along with the bobbin 110 or 1110. For example, the movable AF unit may include the bobbin 110 or 1110, the first coil 120 or 1120 and a lens (not shown) mounted on the bobbin 110 or 1110.

The linear range (hereinafter, referred to as a "first linear range") in a graph exhibiting the relationship between the distance by which the bobbin moves and the magnetic flux of the magnet detected by the position sensor, may be restricted by the positional relationship between the magnet and the position sensor.

In contrast, the embodiment makes it possible to detect displacement of the bobbin 110 or 1110 based on the voltage induced to the second coil 170 or 1170 by the interaction between the first coil 120 or 1120 and the second coil 170 or 1170, and makes it possible to execute AF feedback control in the first direction of the bobbin 110 or 1110 using the detected displacement of the bobbin 1110. In other words, it is possible to control the driving signal supplied to the first coil 120 or 1120 based on the voltage induced to the second coil 170 or 1170.

Accordingly, since there is no necessity for an additional position sensor for detecting displacement of the bobbin 1110, the embodiment makes it possible to reduce the cost of the lens moving apparatus and to facilitate the manufacturing operation.

Furthermore, since the inductive interaction between the first coil 120 or 1120 and the second coil 170 or 1170 is employed, the linear range in a graph plotted between the moving distance by which the bobbin 110 or 1110 moves and an induction voltage caused by inductive interaction may be increased compared to the above-described first linear range. Consequently, the embodiment makes it possible to assure linearity over a wider range, to decrease the defect rate, and to perform more accurate AF feedback control.

Figure 21:
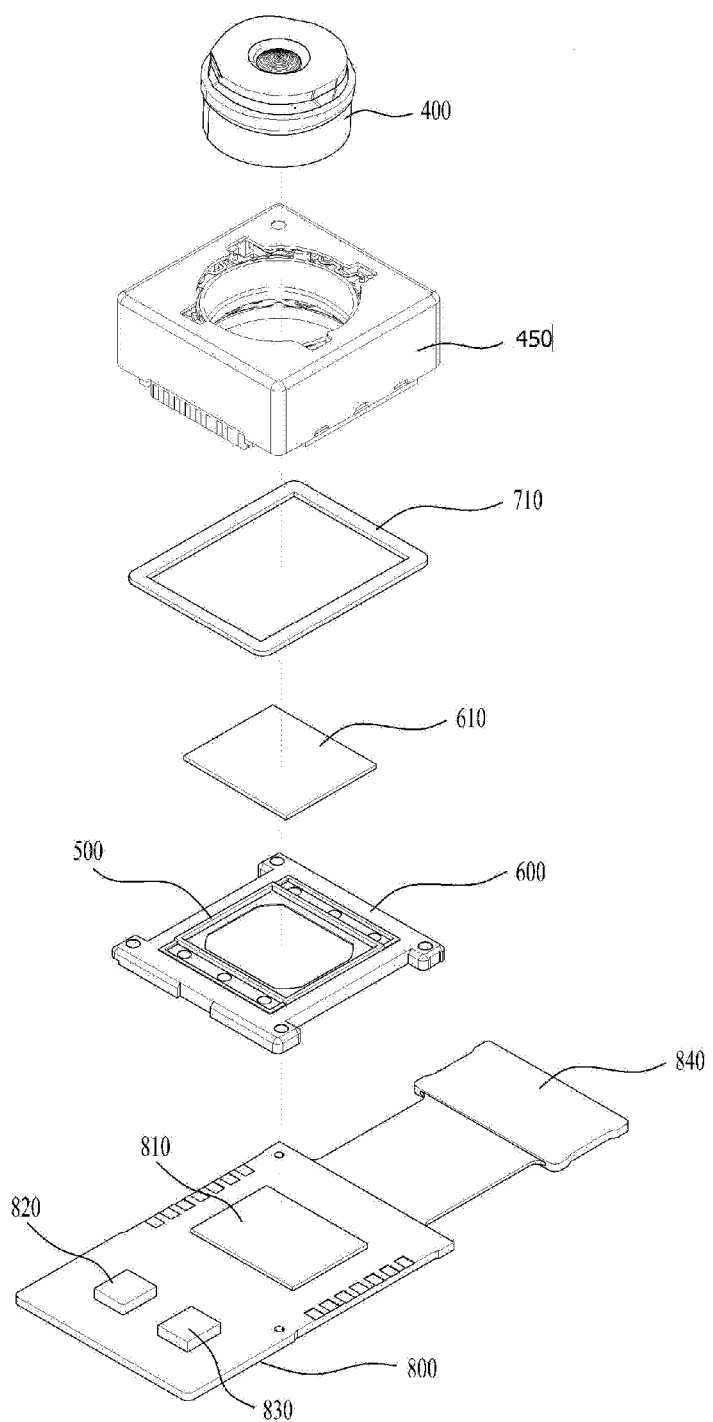
FIG. 21 is an exploded perspective view illustrating a camera module according to an embodiment.

FIG. 21 is an exploded perspective view illustrating a camera module according to an embodiment.

Referring to FIG. 21, the camera module may include a lens barrel 400, a lens moving apparatus, a filter 610, an image sensor 810, a sensor 820, a controller 830 and a connector 840.

The camera module may further include an adhesive member 710, a first holder 600 and a second holder 800.

The lens barrel 400 may be mounted in the bobbin 110 of the lens moving apparatus 450. The lens moving apparatus 450 may be the lens moving apparatus 100 shown in FIG. 1 or the lens moving apparatus shown in FIG. 11.

The first holder 600 may be located under the base 210 or 1210 of the lens moving apparatus 450. The filter 610 may be mounted on the first holder 600, and the first holder 600 may have a raised portion 500 on which the filter 610 is seated.

The adhesive member 710 may couple or attach the base 210 or 1210 of the lens moving apparatus 450 to the first holder 600. In addition to the attachment function described above, the adhesive member 710 may serve to inhibit contaminants from entering the lens moving apparatus 450.

For example, the adhesive member 710 may be, for example, epoxy, thermohardening adhesive, or ultraviolet hardening adhesive.

The filter 610 may serve to inhibit light within a specific frequency band that has passed through the lens barrel 400 from being introduced into the image sensor 810. The filter 610 may be an infrared-light blocking filter, without being limited thereto. Here, the filter 610 may be disposed parallel to the x-y plane.

The region of the first holder 600 in which the filter 610 is mounted may be provided with a bore to allow the light that passes through the filter 610 to be introduced into the image sensor 810.

The second holder 800 may be disposed under the first holder 600, and the image sensor 810 may be mounted on the second holder 600. The light, having passed through the filter 610, is introduced into the image sensor 810 so as to form an image on the image sensor 810.

The second holder 800 may include, for example, various circuits, devices, and a controller in order to convert the image, formed on the image sensor 810, into electrical signals to thereby transmit the same to an external apparatus.

The second holder 800 may be embodied as a circuit board on which the image sensor 810 is mounted, on which a circuit pattern is formed, and to which various devices are coupled.

The image sensor 810 may receive an image included in the light introduced through the lens moving apparatus 450, and may convert the received image into electrical signals.

The filter 610 and the image sensor 810 may be spaced apart from each other so as to be opposite to each other in the first direction.

The sensor 820 may be mounted on the second holder 800, and may be conductively connected to the handshake controller 830 through the circuit pattern formed on the second holder 800.

The sensor 820 may be a device for detecting the movement of the camera module 200. For example, the sensor 820 may be a motion sensor, a dual-axis or triple-axis gyro sensor, an angular speed sensor, an acceleration sensor or a gravity sensor.

The controller 830 may include at least one of an AF feedback controller for AF feedback driving and an OIS feedback controller for performing OIS feedback control.

The controller 830 may be mounted on the second holder 800.

The AF feedback controller may be conductively connected to the first coil 120 or 1120 and the second coil 170 or 1170 of the lens moving apparatus 450. The AF feedback controller may control a driving signal supplied to the first coil 120 or 1120, based on the induction voltage induced to the second coil 170 or 1170.

The OIS feedback controller may be conductively connected to the position sensors 240*a* and 240*b* and the third coils 1230*a* to 1230*d*. The OIS feedback controller may control a signal supplied to the third coils 1230*a* to 1230*d*, based on signals supplied to the position sensors 240*a* and 240*b*.

The connector 840 may have a port for the electrical connection of the second holder 800 and the electrical connection of an external apparatus.

Figure 22:
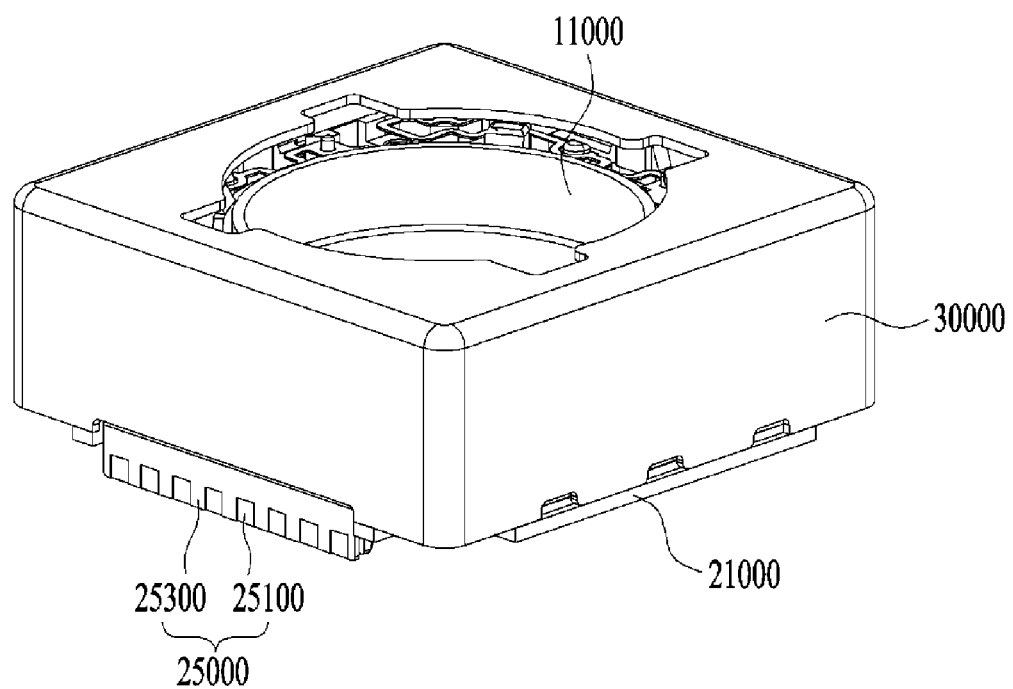
FIG. 22 is a perspective view illustrating a lens moving apparatus according to a further embodiment.
Figure 23:
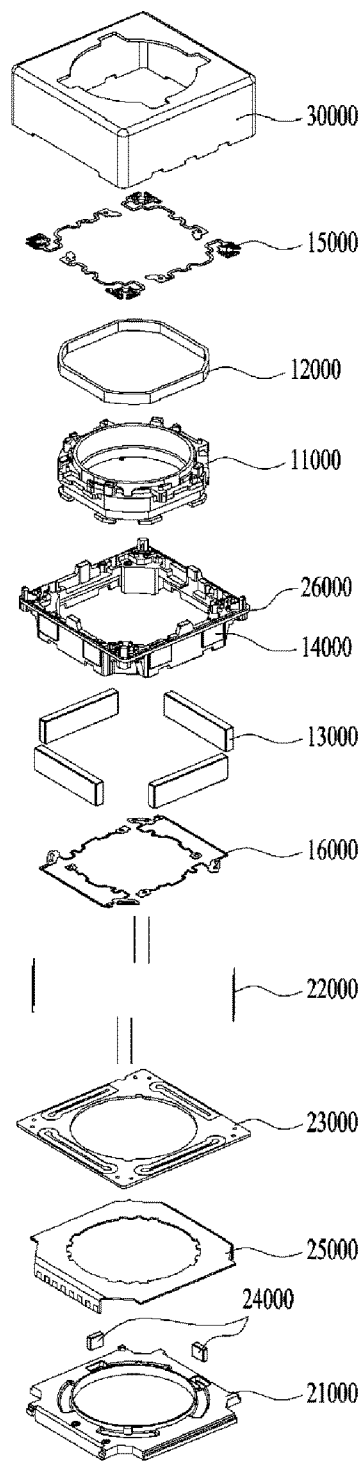
FIG. 23 is an exploded perspective view illustrating the lens moving apparatus according to the further embodiment.

FIG. 22 is a perspective view illustrating a lens moving apparatus according to a further embodiment. FIG. 23 is an exploded perspective view illustrating the lens moving apparatus according to the further embodiment.

A handshake correction apparatus, which is applied to compact camera modules of mobile devices such as smart phones or tablet PCs, is an apparatus configured to inhibit the contour of an image, captured when taking a still image, from being unclearly formed due to vibrations caused by the trembling of the user's hand.

In addition, an auto-focusing apparatus is configured to automatically focus the subject image on the surface of an image sensor (not shown). The handshake correction apparatus and the auto-focusing apparatus may be configured in various manners. In the embodiments, the lens moving apparatus may perform the handshake correction and/or auto-focusing operations in such a manner as to move an optical module, composed of a plurality of lenses, in a first direction or in a plane perpendicular to the first direction.

As illustrated in FIGS. 22 and 23, the lens moving apparatus according to the embodiment may include a movable unit. Here, the movable unit may perform auto-focusing and handshake correction. The movable unit may include a bobbin 11000, a first coil 12000, a magnet 13000, a housing 14000, an upper elastic member 15000, and a lower elastic member 16000.

The bobbin 11000 may be provided inside the housing 14000, and may be provided on the outer circumferential surface thereof with the first coil 12000, which is located inside the magnet 13000 so as to face the magnet 13000.

The first coil 12000 may be installed in the inner space of the housing 14000 so as to be reciprocally movable in the first direction via electromagnetic interaction between the magnet 13000 and the first coil 12000. Specifically, the first coil 12000 may be movable upward and downward with respect to the initial position, at which the first coil 12000 is positioned, when current is not applied to the first coil 12000. The first coil 12000 may be installed on the outer circumferential surface of the bobbin 11000 so as to electromagnetically interact with the magnet 13000.

In addition, the bobbin 11000 may be elastically supported by the upper and lower elastic members 15000 and 16000, thereby performing auto-focusing by moving in the first direction.

The bobbin 11000 may include a lens barrel (not shown) in which at least one lens is installed. The lens barrel may be coupled in various manners within the bobbin 11000.

For example, a female threaded portion may be formed on the inner circumferential surface of the bobbin 11000, and a male threaded portion may be formed on the outer circumferential surface of the lens barrel so as to correspond to the female threaded portion. The lens barrel may be coupled to the bobbin 11000 by virtue of the threaded engagement therebetween.

However, the disclosure is not limited thereto, and instead of forming the threaded portion on the inner circumferential surface of the bobbin 11000, the lens barrel may be directly secured inside the bobbin 11000 by other ways excluding the threaded engagement. Alternatively, one or more lenses may be integrally formed with the bobbin 11000, without incorporating the lens barrel.

The lens coupled to the lens barrel may be constituted by a single lens, or two or more lenses may configure an optical system. Auto-focusing may be controlled in accordance with the direction of current, and may be implemented by movement in the first direction of the bobbin 11000.

For example, the bobbin 11000 may move upward from the initial position thereof when forward current is applied, and the bobbin 11000 may move downward from the initial position thereof when reverse current is applied. Alternatively, the distance by which the bobbin 11000 moves in one direction may be increased or reduced by adjusting the quantity of current in one direction.

The bobbin 11000 may be provided on the upper surface and the lower surface thereof with a plurality of upper support protrusions and lower support protrusions. The upper support protrusions may be configured to have a cylindrical or prismatic shape, and may serve to couple and secure the upper elastic member 15000. The lower support protrusions may be configured to have a cylindrical or prismatic shape, and may serve to couple and secure the lower elastic member 16000, like the upper support protrusions.

The lens moving apparatus according to the embodiment may include a first sensor capable of detecting displacement of the bobbin 11000 while the bobbin 11000 moves in the first direction. In the embodiment, a second coil 26000 may serve as the first sensor, which will be described in detail later.

The upper elastic member 15000 may be provided on the bobbin 11000, and the lower elastic member 16000 may be provided under the bobbin 11000. Here, the upper elastic member 15000 may have through holes corresponding to the upper support protrusions, and the lower elastic member 16000 may have through holes corresponding to the lower support protrusions. The support protrusions and the through holes may be securely coupled to each other via thermal fusion bonding or an adhesive such as, for example, epoxy.

The housing 14000 may take the form of a hollow column to support the magnet 13000, and may have an approximately square shape. The magnet 13000 and the support member 22000 may be coupled respectively to the side surface portions of the housing 14000. In addition, as described above, the bobbin 11000 may be provided inside the housing 14000 so as to move in the first direction by being guided by the elastic members 15000 and 16000.

The upper elastic member 15000 and the lower elastic member 16000 may be coupled to the housing 14000 and the bobbin 11000, and may elastically support the upward and/or downward movement of the bobbin 11000 in the first direction. The upper elastic member 15000 and the lower elastic member 16000 may be embodied as leaf springs.

As shown in FIG. 23, the upper elastic member 15000 may include a plurality of upper elastic member segments, which are separated from each other. By virtue of this multi-segmented configuration, the respective segments of the upper elastic member 15000 may receive current of different polarities or different powers. In addition, the lower elastic member 16000 may also be divided into a plurality of lower elastic member segments, and may be conductively connected to the upper elastic member 15000.

Meanwhile, the upper elastic member 15000, the lower elastic member 16000, the bobbin 11000, and the housing 14000 may be assembled with one another via thermal fusion bonding, an adhesive or the like.

The base 21000 may be disposed below the bobbin 11000, and may have an approximately square shape. A circuit board 25000 may be placed or seated on the base 21000.

The surface of the base 21000 that faces the portion of the circuit board 25000 on which the terminal surface 25300 is provided may be provided with a support recess, which is sized to correspond to the terminal surface 25300. The support recess may be indented to a given depth from the outer circumferential surface of the base 21000, so as to inhibit the portion provided with the terminal surface 25300 from protruding outward, or to adjust the distance by which the portion provided with the terminal surface 25300 protrudes.

The support member 22000 may be disposed at the side surface of the housing 14000 so as to be spaced apart from the housing 14000, and may be coupled at the upper end thereof to the upper elastic member 15000 and at the lower end thereof to the base 21000, the circuit board 25000 or the circuit member 23100. The support member 22000 may support the bobbin 11000 and the housing 14000 so that the bobbin 11000 and the housing 14000 are movable in the second direction and the third direction, which are perpendicular to the first direction. In addition, the support member 22000 may be conductively connected to the first coil 12000.

One support member 22000 according to the embodiment is located at each outer surface of the corners of the housing 14000, and therefore a total of four support members may be symmetrically arranged. In addition, the support member 22000 may be conductively connected to the upper elastic member 15000. For example, the support member 22000 may be conductively connected to the portion of the upper elastic member 15000 in which the through holes are formed.

In addition, because the support member 22000 is formed separately from the upper elastic member 15000, the support member 22000 and the upper elastic member 15000 may be conductively connected to each other using, for example, a conductive adhesive or solder. Accordingly, the upper elastic member 15000 may apply current to the first coil 12000 through the support member 22000 conductively connected thereto.

The support member 22000 may be connected to the circuit board 25000 through the through hole formed in the circuit member 23100 and the circuit board 25000. Alternatively, the support member 22000 may be conductively connected to the corresponding portion of the circuit member 23100 by soldering, without forming the through hole in the circuit member 23100 and/or the circuit board 25000.

Meanwhile, although FIG. 23 illustrates a linear support member 22000 according to one embodiment, the disclosure is not limited thereto. That is, the support member 22000 may take the form of a plate member or the like.

The third coil 23000 may perform handshake correction by moving the housing 14000 in the second direction and/or the third direction via electromagnetic interaction with the magnet 13000.

Here, the second direction and the third direction may include not only the x-axis direction (or the first direction) and the y-axis direction (or the second direction), but also directions that are substantially close to the x-axis and y-axis directions.

In the embodiment, although the housing 14000 may move parallel to the x-axis and the y-axis in terms of driving, the housing 14000 may also move slightly obliquely relative to the x-axis and the y-axis when moved while being supported by the support member 22000. Accordingly, it is necessary to install the magnet 13000 at a position corresponding to the third coil 23000.

The third coil 23000 may be disposed so as to be opposite to the magnet 13000 fixed to the housing 14000. In one embodiment, the third coil 23000 may be disposed under the magnet 13000 so as to be spaced apart from the magnet 13000 by a predetermined distance. Alternatively, the third coil 23000 may be disposed outside the magnet 13000.

According to the embodiment, a total of four second coils 23000 may be installed on four corners of a circuit member 23100, without being limited thereto. Alternatively, only two second coils, including one second-direction second coil and one third-direction second coil, may be disposed, or four or more second coils may be disposed.

Alternatively, a total of six second coils including one second-direction second coil disposed at the first side of the circuit member 23100, two second-direction second coils disposed at the second side, one third-direction second coil disposed at the third side, and two third-direction second coils disposed at the fourth side may also be disposed. In this case, the first side may be positioned adjacent to the fourth side, and the second side may be positioned adjacent to the third side.

In the embodiment, a circuit pattern may be formed in the third coil 23000 on the circuit member 23100, or an additional second coil may be disposed above the circuit member 23100, without being limited thereto. Alternatively, a circuit pattern may be directly formed in the third coil 23000 on the circuit member 23100.

Alternatively, the third coil 23000 may be formed by winding a wire in a donut shape, or may be configured as an FP coil, so as to be conductively connected to the circuit board 25000.

The circuit member 23100 including the third coil 23000 may be installed or disposed on the upper surface of the circuit board 25000, which is disposed above the base 21000. However, the disclosure is not limited thereto, and the third coil 23000 may come into close contact with the base 21000, or may be spaced apart from the base 21000 by a predetermined distance. The third coil 23000 may be formed on a separate board, and in turn the board may be stacked on and connected to the circuit board 25000.

The circuit board 25000 may be conductively connected to at least one of the upper elastic member 15000 and the lower elastic member 16000. The circuit board 25000 may be disposed under the third coil 23000, and may be coupled to the upper surface of the base 21000. As illustrated in FIG. 23, the circuit board 25000 may have a through hole formed at a position corresponding to one end of the support member 22000, so as to allow the support member 22000 to extend therethrough. Alternatively, the circuit board 25000 may be conductively connected and/or bonded to the support member 22000, without forming the through hole.

The circuit board 25000 may have a plurality of terminals 25100, which are disposed or formed thereon. The terminals 25100 may be disposed on a bent terminal surface 25300. The plurality of terminals 25100 may be disposed on the terminal surface 25300, and may receive external power so as to supply current to the first coil 12000 and/or the third coil 23000.

The number of terminals formed on the terminal surface 25300 may be increased or reduced in accordance with the kind of components, which are required to be controlled. In addition, the circuit board 25000 may have one terminal surface 25300, or may have two or more terminal surfaces 25300.

A cover member 30000 may be configured to have a boxlike shape so as to accommodate, for example, the movable unit, the third coil 23000, and a portion of the circuit board 25000, and may be coupled to the base 21000.

The cover member 30000 may protect, for example, the movable unit, the third coil 23000, and the circuit board 25000 accommodated therein so as to inhibit the components from being damaged. In addition, the cover member 1300 may restrict the range of motion of the movable unit accommodated therein.

Figure 24:
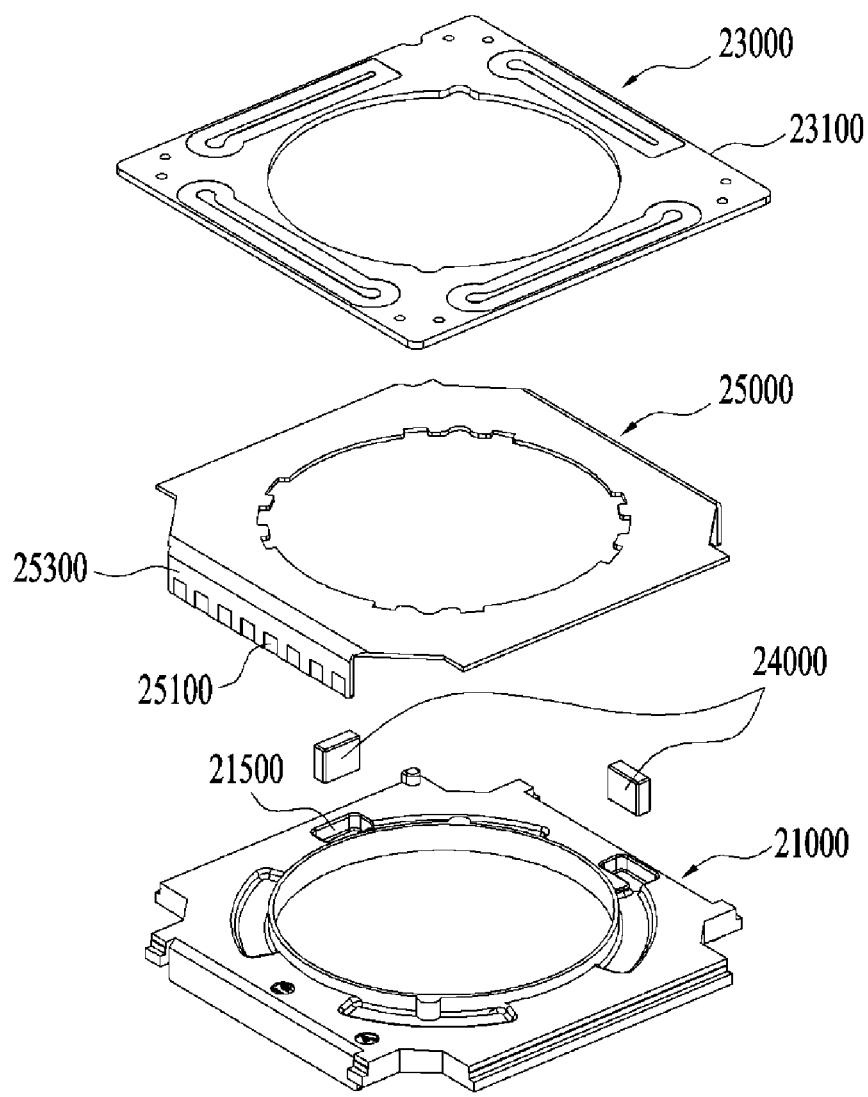
FIG. 24 is an exploded perspective view illustrating the base, the circuit board and the second coil according to the embodiment.

FIG. 24 is an exploded perspective view illustrating the base 21000, the circuit board 25000 and the third coil 23000 according to the embodiment. The lens moving apparatus may further include a second sensor 24000.

The second sensor 24000 is disposed at the center of the third coil 23000 so as to detect movement of the housing 14000. Here, the second sensor 24000 may detect movement in the second and/or third direction of the housing 14000.

The second sensor 24000 may be embodied as a Hall sensor or the like, and may be embodied as any sensor as long as the sensor is able to detect variation in magnetic force. As illustrated in FIG. 24, the second sensor 24000 may include a total of two second sensors, which are installed at side portions of the base 21000, which is disposed under the circuit board 25000, and the second sensors 24000 may be fitted into second sensor mounting grooves 21500 formed in the base 21000. The lower surface of the circuit board 25000 may be the surface opposite to the surface on which the third coil 23000 is disposed.

The second sensor 24000 may be disposed under the third coil 23000 so as to be spaced apart from the third coil 23000 with the circuit board 25000 interposed therebetween. Specifically, the third coil 23000 may be disposed on the circuit board 25000, and the second sensor 24000 may be disposed on the lower surface of the circuit board 25000, without the second sensor 24000 being directly connected to the third coil 23000.

Figure 25:
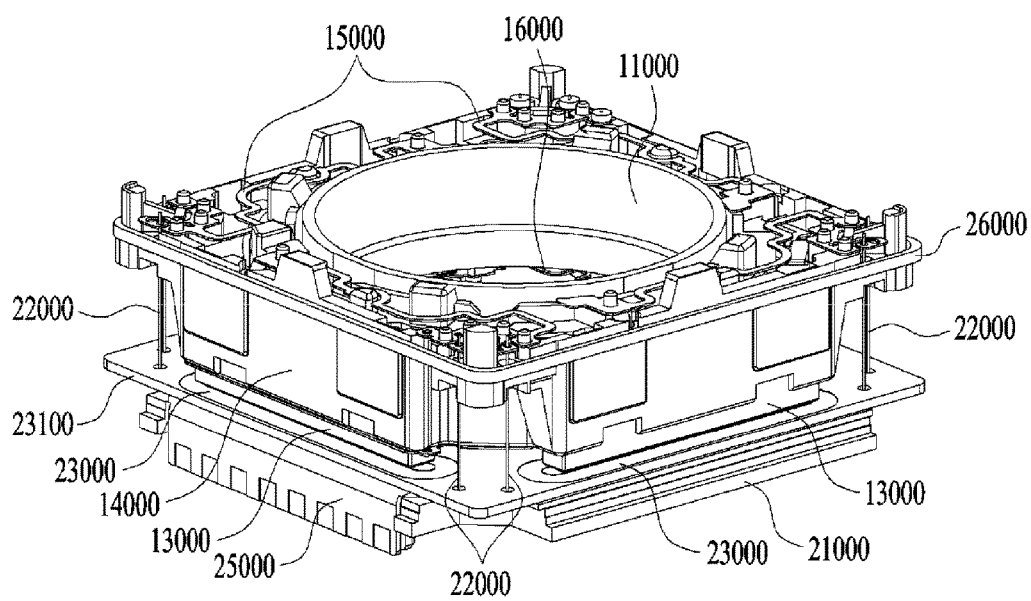
FIG. 25 is a perspective view illustrating the lens moving apparatus according to the further embodiment, from which the cover member is removed.
Figure 26:
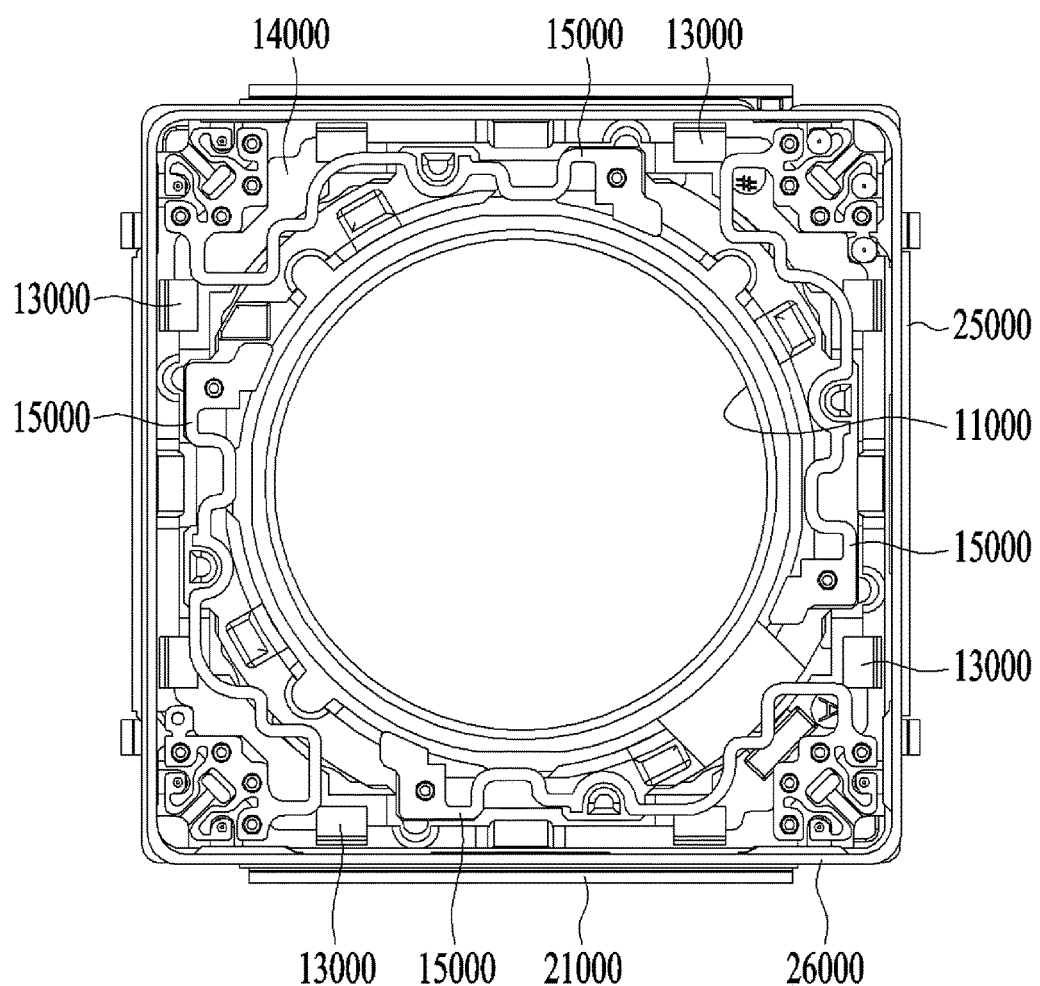
FIG. 26 is a plan view of FIG. 25.
Figure 27:
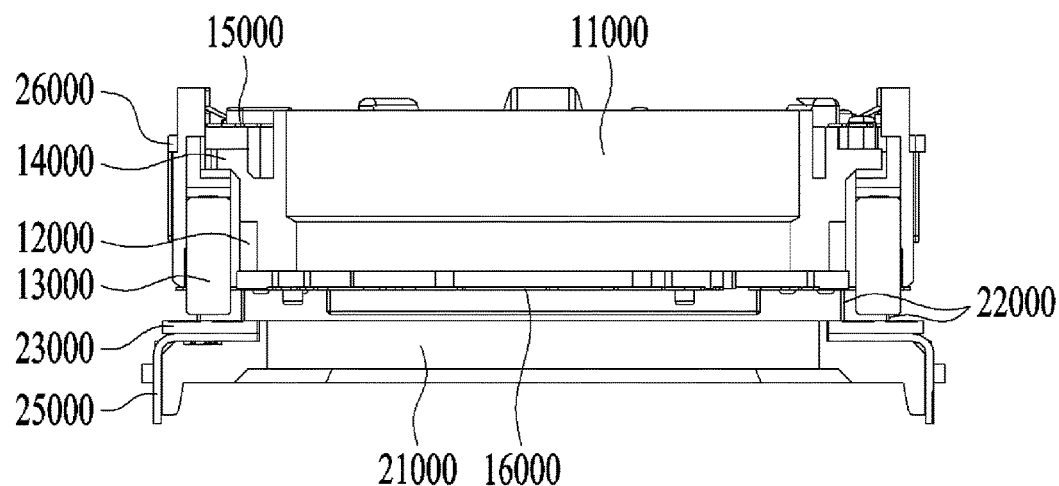
FIG. 27 is a cross-sectional view of FIG. 25.

FIG. 25 is a perspective view illustrating the lens moving apparatus according to the further embodiment, from which the cover member 30000 is removed. FIG. 26 is a plan view of FIG. 25. FIG. 27 is a cross-sectional view of FIG. 25.

The lens moving apparatus according to the embodiment may include the second coil 26000. The second coil 26000 may function to detect displacement of the bobbin 11000 when the bobbin 11000 moves in the first direction for auto-focusing.

The second coil 26000 may be provided outside the housing 14000. As the bobbin 11000 moves in the first direction, the second coil 26000 may generate electromotive force resulting from the inductive interaction between the second coil 26000 and the first coil 12000.

Accordingly, the lens moving apparatus according to the embodiment may detect displacement in the first direction of the bobbin 11000 by measuring variation in the voltage of the electromotive force generated from the second coil 26000.

A driving signal, that is, power and current, may be applied to the first coil 12000 such that the bobbin 11000 is movable in the first direction by the electromagnetic interaction between the first coil 12000 and the magnet 13000. The driving signal may be an AC signal. The AC signal may be a sine wave signal or a pulse signal. Specifically, in the case of the pulse signal, the AC signal may be a DC signal or a pulse width modulation (PWM) signal. The application of an AC signal to the first coil 12000 is intended to induce electromotive force to the second coil 26000 by the inductive interaction.

With the application of the driving signal, current may flow through the first coil 12000. Electromagnetic interaction occurs between the current flowing through the first coil 12000 and the magnet 13000, and the first coil 12000 is movable upward and downward in the first direction along with the bobbin 11000 owing to the resulting electromagnetic force.

As the first coil 12000 moves in the first direction, the distance in the first direction between the first coil 12000 and the second coil 26000 varies. Owing to the variation in the distance, electromotive force, current and voltage are induced to the second coil 26000 by the inductive interaction.

Specifically, as the distance in the first direction therebetween decreases, the electromotive force, current and voltage, which are induced to the second coil 26000, may increase. In contrast, as the distance in the first direction therebetween increases, the electromotive force, current and voltage, which are induced to the second coil 26000, may decrease.

Accordingly, the embodiment is able to detect displacement of the first coil 12000 based on the magnitude of the voltage induced to the second coil 26000. As a result, it is possible to detect displacement in the first direction of the bobbin 11000 based on the detected displacement of the first coil 12000.

Consequently, the lens moving apparatus according to the embodiment is able to perform an auto-focusing function by controlling a driving signal, that is, the magnitude of current applied to the first coil 12000 and in turn controlling the position of the bobbin 11000 in the first direction.

As illustrated in FIGS. 25 to 27, the housing 14000 may be configured to have a polygonal shape when viewed in the first direction, and the second coil 26000 may be configured to surround the outer side surface of the housing 14000.

In the embodiment, although the housing 14000 is configured to have a rectangular shape when viewed in the first direction, it may also be configured to have a polygonal shape having five or more corners. In another embodiment, the second coil 26000 may be provided on the inner surface of the cover member 30000.

In the embodiment, the second coil 26000 may be disposed on the upper portion of the housing 14000, and may be disposed so as to be spaced apart from the third coil 23000 in the first direction. In other words, the second coil 26000 and the third coil 23000 may be disposed so as to be spaced apart from each other by as great a distance as possible.

The third coil 23000 may be disposed under the magnet 13000 so as to be spaced apart from the magnet 13000 by a predetermined distance and to be opposite to the magnet 13000. Accordingly, the third coil 23000 and the second coil 26000 may be disposed at positions at which they have an electromagnetic effect on each other.

In order to perform handshake correction, a driving signal may be applied to the third coil 23000. The driving signal may be an AC signal. The AC signal may be a sine wave signal or a pulse signal. Specifically, in the case of the pulse signal, the AC signal may be, for example, a pulse width modulation (PWM) signal.

When a driving signal is applied to the third coil 23000, an electromagnetic wave or electromagnetic field may be generated from the third coil 23000. The electromagnetic wave or electromagnetic field may generate electromotive force, current and voltage through the inductive interaction with the second coil 26000.

The electromotive force and the like of the second coil 26000, which are induced by the third coil 23000, are not intentional, and may interfere with each other while the second coil 26000 detects the position of the bobbin 11000, thereby hindering accurate detection of the position of the bobbin 11000 by the second coil 26000.

In order to suppress the generation of electromotive force, which is induced to the second coil 26000 from the third coil 23000, the second coil 26000 may be disposed on the upper portion of the housing 14000 such that the second coil 26000 and the third coil 23000 are spaced apart from each other in the first direction by as great a distance as possible.

Figure 28:
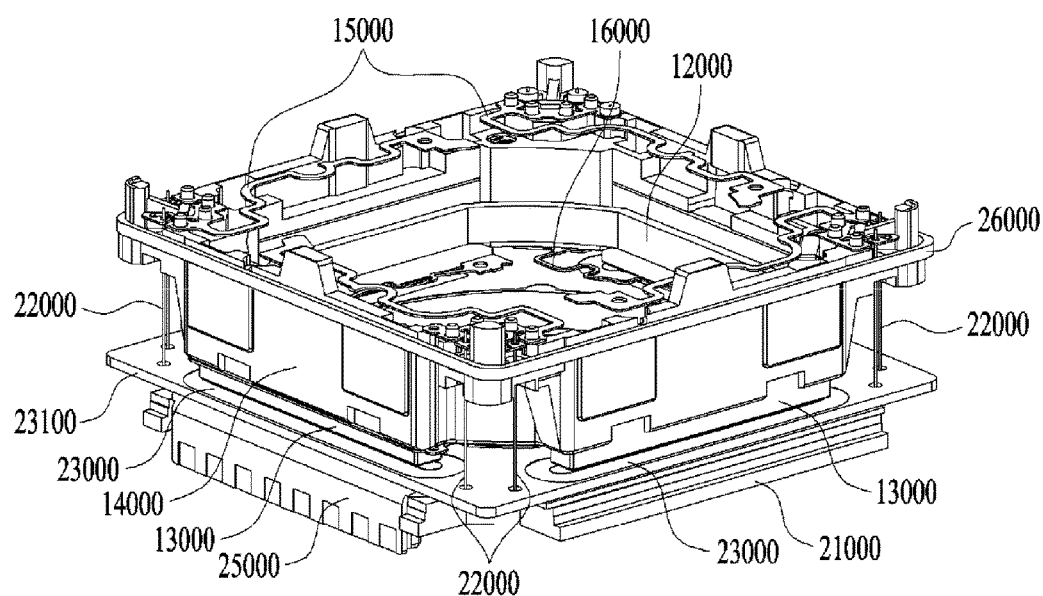
FIG. 28 is a perspective view illustrating the lens moving apparatus shown in FIG. 25, from which the bobbin is removed.
Figure 29:
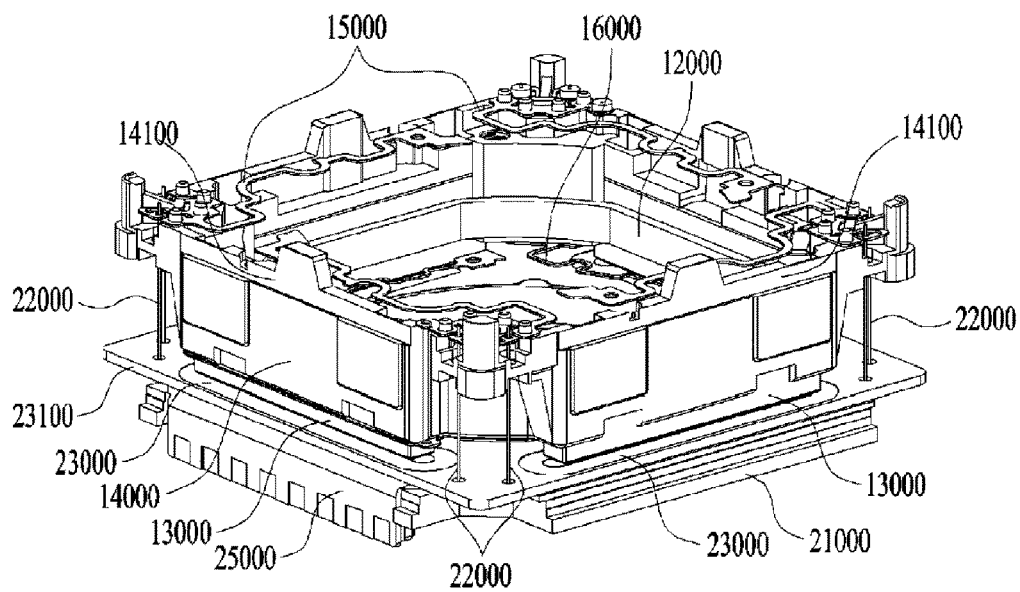
FIG. 29 is a perspective view illustrating the lens moving apparatus shown in FIG. 28, from which the third coil is removed.

FIG. 28 is a perspective view illustrating the lens moving apparatus shown in FIG. 25, from which the bobbin 11000 is removed. FIG. 29 is a perspective view illustrating the lens moving apparatus shown in FIG. 28, from which the second coil 26000 is removed. In the embodiment, the housing 14000 may include a first seating portion 14100.

The first seating portion 14100 is a portion that is formed on the outer side surface of the housing 14000 and on which the second coil 26000 is mounted. Specifically, the first seating portion 14100 may be formed by depressing the outer side surface of the housing 14000, as illustrated in FIG. 29.

In the embodiment, since the second coil 26000 is disposed on the upper portion of the housing 14000, the first seating portion 14100 may also be formed on the upper portion of the housing 14000 so as to correspond to the position of the second coil 26000.

The second coil 26000 have the overall shape of a closed loop so as to surround the upper portion of the housing 14000 when viewed in the first direction. Accordingly, the first seating portion 14100 may also be configured to surround the upper portion of the housing 14000 so as to correspond to the shape of the second coil 26000 when viewed in the first direction. In another embodiment, a mounting groove may be formed in the housing 14000 such that the second coil 26000 is directly wound in the mounting groove.

The third coils 26000 may be mounted on the first seating portion 14100 and may be secured or coupled to the surface of the housing 14000 using an adhesive or the like. The adhesive may be, for example, epoxy, thermohardening adhesive or optical hardening adhesive.

In order to efficiently employ the inductive interaction between the first coil 12000 and the second coil 26000, the first coil 12000 and the second coil 26000 may be disposed such that the direction in which the first coil 12000 is wound and the direction in which the second coil 26000 are parallel to each other.

As illustrated in FIG. 28, both the first coil 12000 and the second coil 26000 may be wound in the direction parallel to the x-y plane, defined by the second and third directions, which are perpendicular to the first direction.

As described above, the lens moving apparatus may further include the support member 22000, which is disposed at the side surface of the housing 14000 so as to be spaced apart from the housing 14000 and which supports the bobbin 11000 and the housing 14000 in such a manner as to permit the bobbin 11000 and the housing 14000 to be movable in the second and/or third direction, perpendicular to the first direction. The lens moving apparatus may further include the circuit board 25000, which is disposed under the third coil 23000.

The two ends of the second coil 26000 may be conductively connected to the upper elastic member 15000, and the upper elastic member 15000 may in turn be conductively connected to the support member 22000.

The support member 22000 may be conductively connected to the circuit board 25000. The circuit board 25000 may be conductively connected to an external device, for example, the main board (not shown) of the camera module.

It is sufficient for the second coil 26000 to transmit only variation in voltage, which occurs due to the inductive interaction, to the circuit board 25000 and the main board, and but there is a need to transmit an additional signal regarding the position of the bobbin 11000.

Accordingly, at least four linear support members 22000 are necessary in the embodiment. Specifically, two of the support members 22000 are connected to two ends of the first coil 12000 so as to apply current to the first coil 12000, and the remaining two support members 22000 are connected to two ends of the second coil 26000 so as to allow the variation in voltage caused by the inductive interaction to be transmitted to the circuit board 25000.

In the case where an additional position sensor for the detection of displacement of the bobbin 11000, for example, a Hall sensor, a magnetoresistive sensor or the like, is used, unlike the embodiment, it is necessary for the position sensor to have two terminals for the application of current and two terminals for transmitting the detected signal.

Consequently, it is necessary to provide four support members 22000 to be connected to the terminals, and it is further necessary to provide two support members 22000 to be connected to two ends of the first coil 12000.

Accordingly, a lens moving apparatus, which is configured to detect displacement of the bobbin 11000 using an additional position sensor, requires at least six linear support members 22000. In the embodiment, in the case where the second coil 26000 is used without using an additional position sensor, the minimum number of linear support members 22000 may be reduced to four from six.

Accordingly, the embodiment is able to simplify the structure of the lens moving apparatus and to reduce the manufacturing cost by detecting displacement of the bobbin 11000 using the second coil 26000, which generates an electromotive force resulting from the inductive interaction, without having to use an additional position sensor. Furthermore, in the case in which an additional position sensor is used, it is necessary to provide an additional PCB, which is required to mount the position sensor, and a structure for securing the PCB to the housing 14000 and the bobbin 11000. However, when the second coil 26000 is used, it is not necessary to provide the PCB or the structure for securing the PCB.

Furthermore, although the additional position sensor may greatly restrict the linear range in output due to the positional relationship between the position sensor and the magnet 13000, the use of the second coil 26000, which employs inductive interaction, broadens the range of linear variation in the voltage of the second coil 26000, thereby enabling accurate detection of the position of the bobbin 11000 over a wider range.

Figure 30:
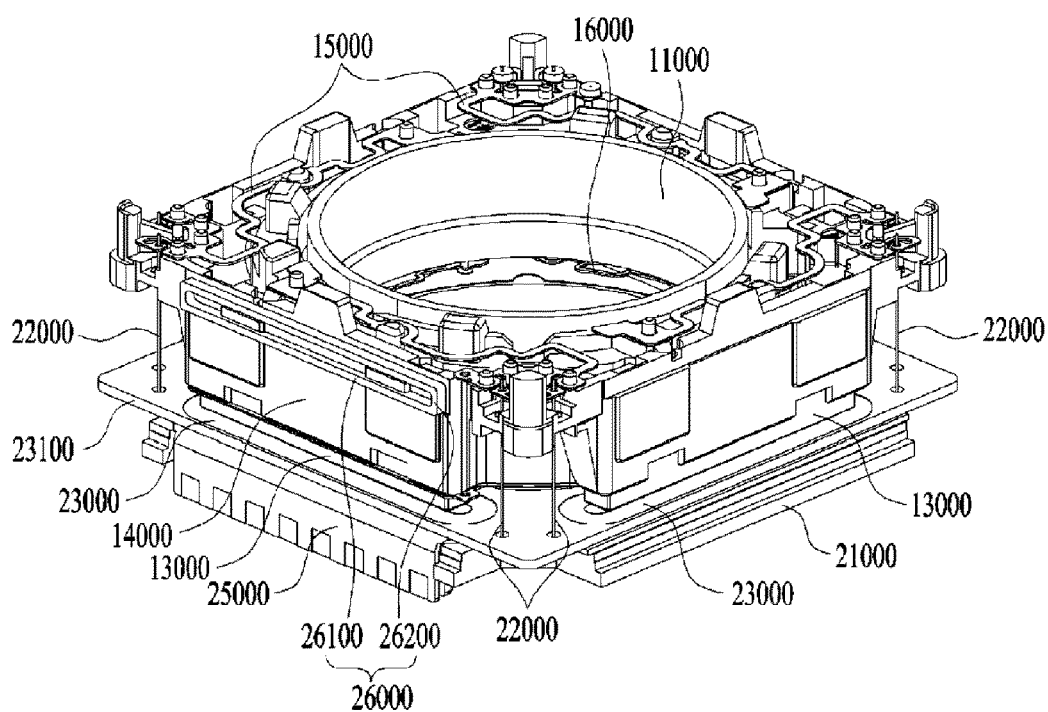
FIG. 30 is a perspective view illustrating the lens moving apparatus according to the embodiment, from which the cover member is removed.
Figure 31:
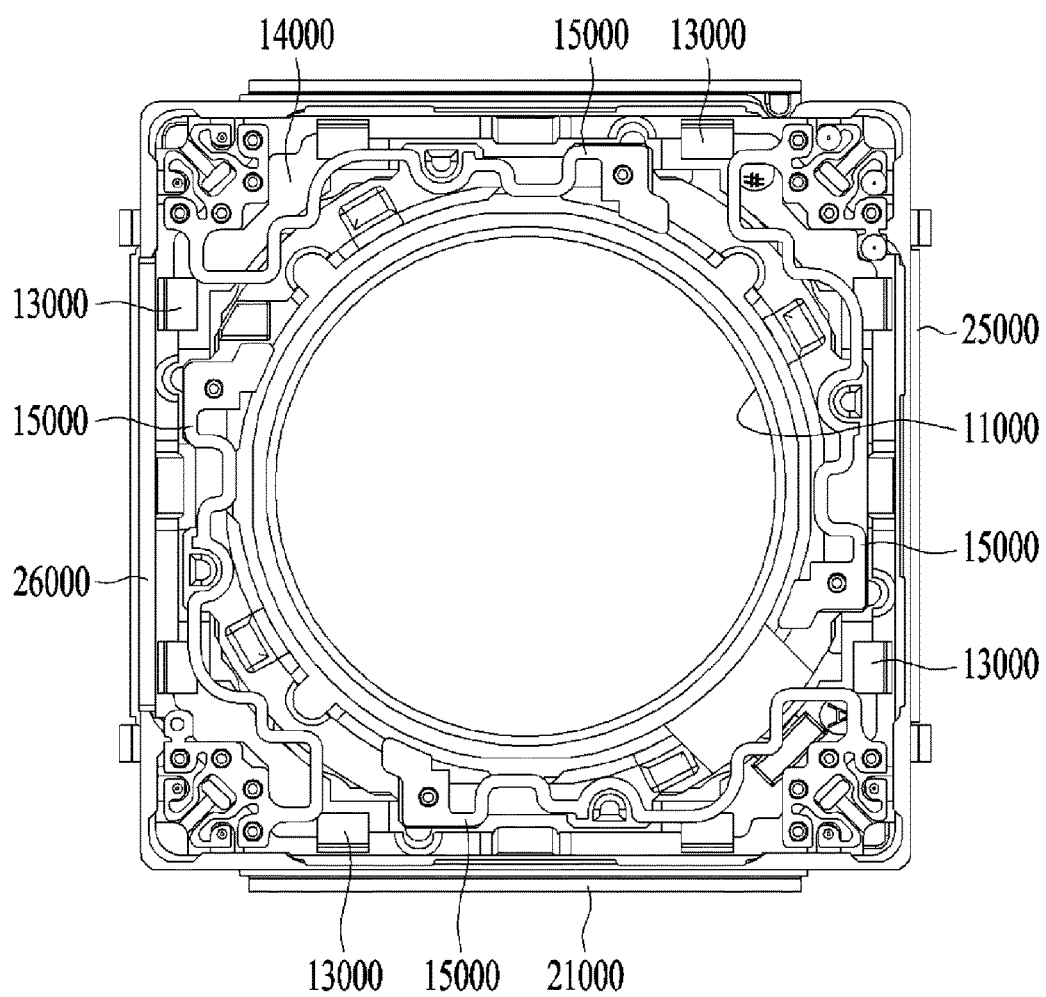
FIG. 31 is a plan view of FIG. 30.
Figure 32:
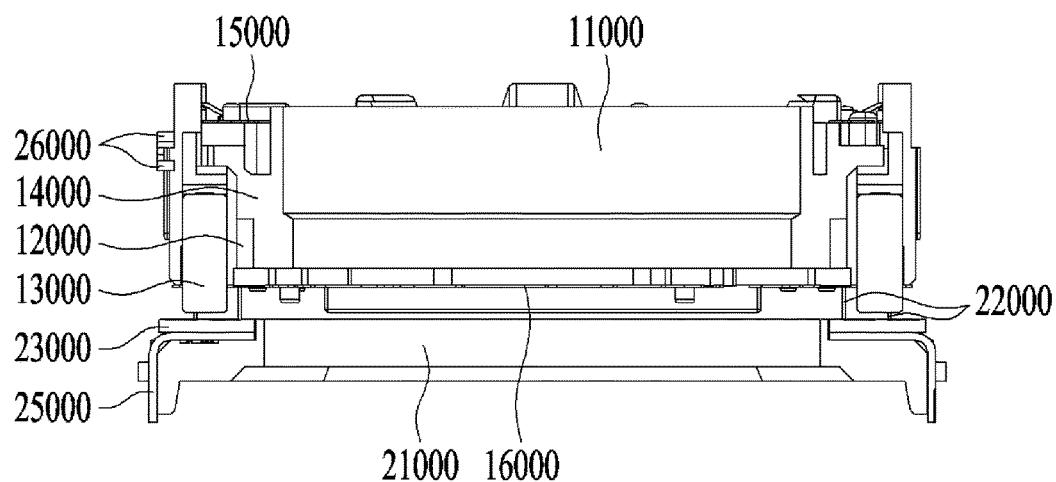
FIG. 32 is a cross-sectional view of FIG. 30.

FIG. 30 is a perspective view illustrating the lens moving apparatus according to the embodiment, from which the cover member 30000 is removed. FIG. 31 is a plan view of FIG. 30. FIG. 32 is a cross-sectional view of FIG. 30.

As illustrated in FIG. 30, the second coil 26000 may be disposed on at least one of the outer side surfaces of the housing 14000. For example, the second coil 26000 may be configured to have a closed loop shape having a linear part 26100 and a curved part 26200.

As the bobbin 11000 moves in the first direction, the second coil 26000 may generate an electromotive force resulting from the inductive interaction with the first coil 12000. Accordingly, the lens moving apparatus according to the embodiment is able to detect displacement in the first direction of the bobbin 11000 by measuring variation in voltage of the electromotive force generated by the second coil 26000.

The housing 14000 may be configured to have a polygonal shape when viewed in the first direction. Although the housing 14000 is configured to have a rectangular shape when viewed in the first direction in the embodiment, it may also be configured to have a polygonal shape having five or more corners.

As illustrated in FIGS. 30 to 32, in order to suppress the generation of electromotive force, which is induced to the second coil 26000 from the third coil 23000, as much as possible, the second coil 26000 may be disposed on the upper portion of the housing 14000 such that the second coil 26000 and the third coil 23000 are spaced apart from each other by as great a distance as possible.

Figure 33:
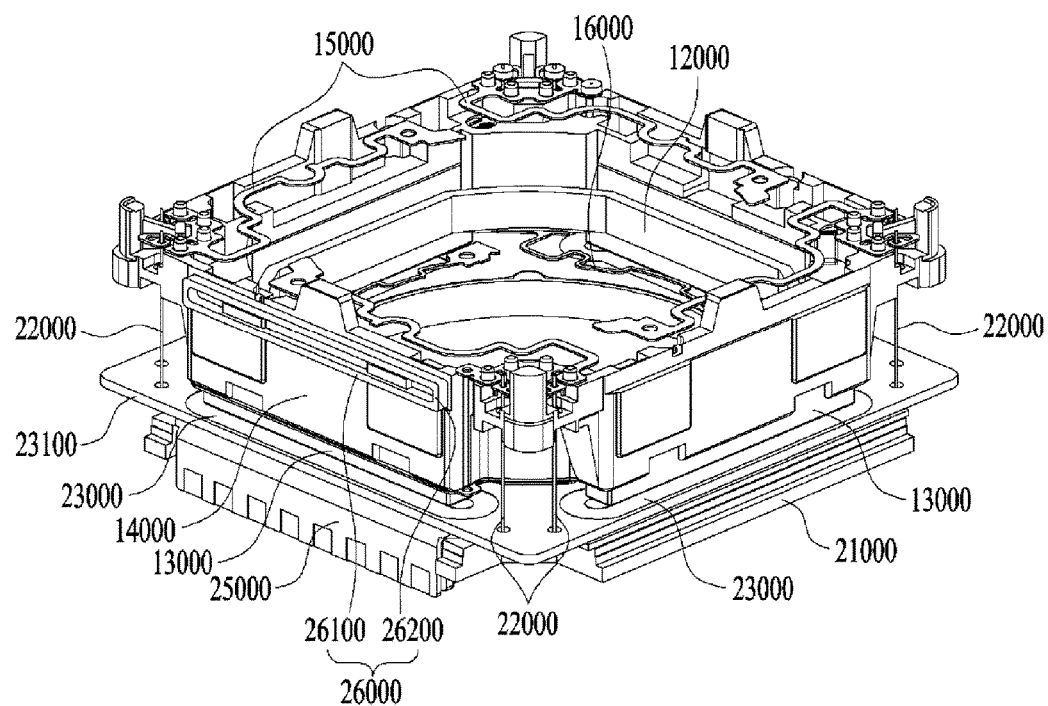
FIG. 33 is a perspective view illustrating the lens moving apparatus shown in FIG. 30, from which the bobbin is removed.
Figure 34:
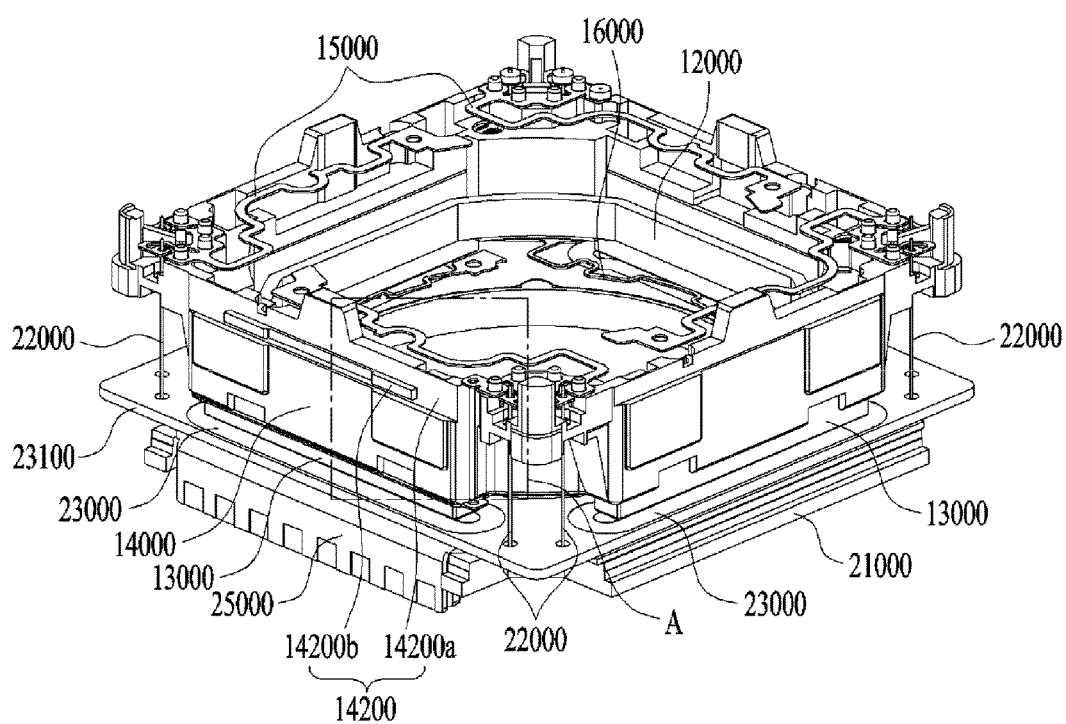
FIG. 34 is a perspective view illustrating the lens moving apparatus shown in FIG. 33, from which the third coil is removed.
Figure 35:
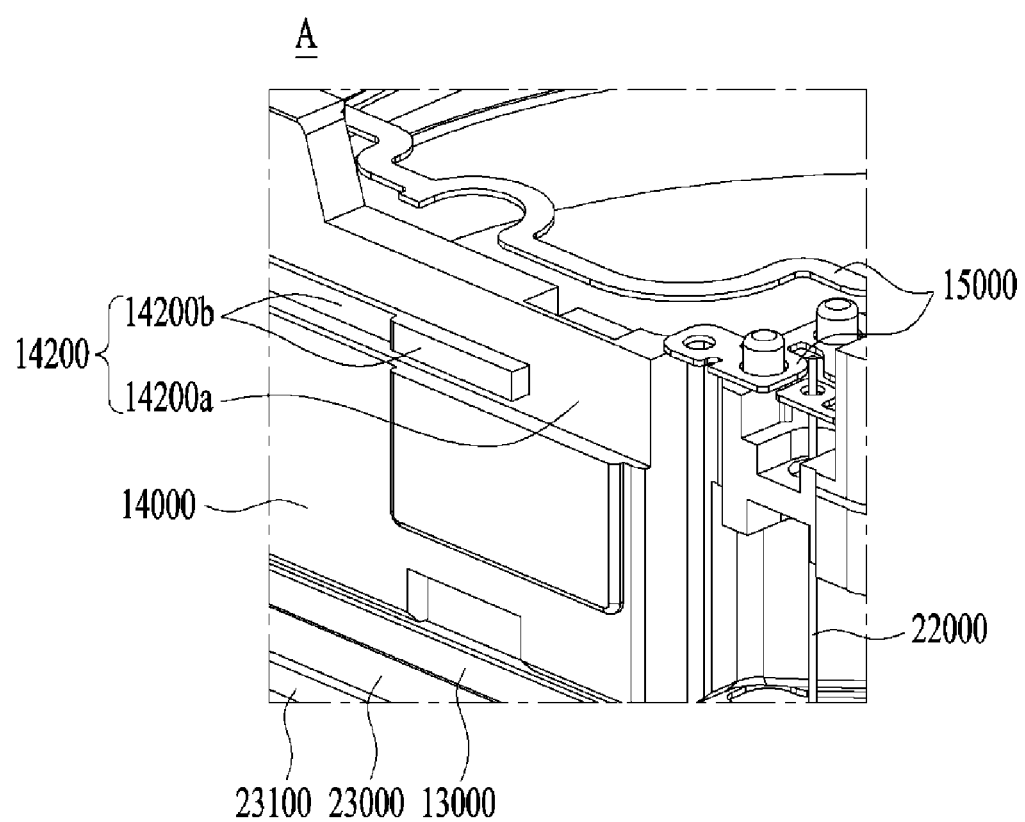
FIG. 35 is an enlarged view illustrating portion A in FIG. 34.

FIG. 33 is a perspective view illustrating the lens moving apparatus shown in FIG. 30, from which the bobbin 11000 has been removed. FIG. 34 is a perspective view illustrating the lens moving apparatus shown in FIG. 33, from which the second coil 26000 has been removed. FIG. 35 is an enlarged view illustrating portion A in FIG. 34. In the embodiment, the housing 14000 may include a second seating portion 14200.

The second seating portion 14200 is a portion, which is formed on the outer side surface of the housing 14000 and on which the second coil 26000 is mounted. Specifically, the second seating portion 14200 may include a recess 14200A and a raised support 14200*b*, as illustrated in FIG. 34.

The recess 14200A may be formed in the outer side surface of the housing 14000. The raised support 14200*b* may be raised from the recess 14200A. In the embodiment, although the raised support 14200*b* is illustrated as being raised at opposite ends thereof more than at the center thereof, the disclosure is not limited thereto.

In another embodiment, the raised support 14200*b* may be raised by the same extent at both the opposite ends and the center, or may be raised at the center thereof more than at the opposite ends thereof. The inner surface of the closed loop of the second coil 26000 may be supported by the raised support, thereby seating second coil 26000 in the recess. The second coil 26000 may be seated on the second seating portion 14200, and may be secured or coupled to the surface of the housing 14000.

In order to efficiently employ the inductive interaction between the first coil 12000 and the second coil 26000, the first coil 12000 and the second coil 26000 may be disposed such that the direction in which the first coil 12000 is wound and the direction in which the second coil 26000 is wound are parallel to each other.

For example, the second coil 26000 may be configured such that the linear part 26100 thereof is longer than the curved part 26200, and may be wound in the longitudinal direction of the linear part 26100, as illustrated in FIG. 30. Both the first coil 12000 and the linear part 26100 of the second coil 26000 may be wound in the direction parallel to the x-y plane defined by the second and third directions, which are perpendicular to the first direction.

As in the description given with reference to FIGS. 25 to 28, two ends of the second coil 26000 may be conductively connected to the upper elastic member 15000. The upper elastic member 15000 may be conductively connected to the support member 22000. The support member 22000 may be conductively connected to the circuit board 25000. The circuit board 25000 may be connected to the main board.

It is sufficient for the second coil 26000 to transmit only variation in voltage, which occurs due to the inductive interaction, to the circuit board 25000 and the main board, and but there is a need to transmit an additional signal regarding the position of the bobbin 11000. Accordingly, the embodiment requires at least four support members 22000, as described above. Generally, the equivalent circuit of a coil is constituted by a resistance component, an inductance component and a capacitance component, and thus has an inherent electrical resonant frequency, which is referred to as a self-resonant frequency. A coil causes resonance at the resonant frequency. At this time, current and voltage that flow through the coil are maximized.

Accordingly, since the circuit has the maximum current and voltage at the self-resonant frequency, it is possible to create a strong electromagnetic wave and a strong electromagnetic field. The reason for this is because the magnitude of current and voltage are proportional to the magnitude of the electromagnetic wave and electromagnetic field.

Consequently, when the first coil 12000 and the third coil 23000 have the same self-resonant frequency, each of the circuit including the first coil 12000 and the circuit including the third coil 23000 may create a strong electromagnetic wave and a strong electromagnetic field, whereby the first coil 12000 and the third coil 23000 may cause increased electromagnetic interference with each other.

The electromagnetic interference between the first coil 12000 and the third coil 23000 may disrupt the function of the first coil 12000 and the third coil 23000. As a result, the functions of auto-focusing and handshake correction of the lens moving apparatus may be deteriorated.

Accordingly, in order to inhibit the deterioration in the functions of auto-focusing and handshake correction of the lens moving apparatus, the first and second coils 12000 and 23000 are preferably designed so as to have different self-resonant frequencies.

Here, the self-resonant frequency of the first coil 12000 and the self-resonant frequency of the third coil 23000 are preferably designed so as to have a difference therebetween of 20 kHz or more. More preferably, the self-resonant frequency of the first coil 12000 and the self-resonant frequency of the third coil 23000 may have a difference therebetween of 20 kHz to 3 MHz.

As described previously, in order to reduce the deterioration in the functions of the third coil 23000 and the second coil 26000, the third coil 23000 and the second coil 26000 preferably have different self-resonant frequencies.

Here, the self-resonant frequency of the third coil 23000 and the self-resonant frequency of the second coil 26000 are preferably designed so as to have a difference therebetween of 20 kHz or more. More preferably, the self-resonant frequency of the third coil 23000 and the self-resonant frequency of the second coil 26000 have a difference therebetween of 20 kHz to 3 MHz. When the driving single applied to the third coil 23000 is a PWM signal, noise may be transmitted to the image sensor (not shown) provided under the third coil 23000 in response to the PWM signal of the third coil 23000, thereby causing deterioration in the functionality of the image sensor.

The noise may cause deterioration in the function of the image sensor, and may thus cause distortion and degradation of an image formed on the image sensor. Accordingly, the third coil 23000 may be designed so as to have a self-resonant frequency of 0.5 MHz or more, and preferably a self-resonant frequency ranging from 0.5 MHz to 7 MHz.

Furthermore, in order to minimize the problem whereby high-frequency noise generated from the third coil 23000 is transmitted to the first coil 12000, the self-resonant frequency of the first coil 12000 and the self-resonant frequency of the third coil 23000 need to have a difference therebetween of 20 kHz, and preferably a difference therebetween of 20 kHz to 3 MHz.

In addition, in order to minimize the problem whereby high-frequency noise generated from the third coil 23000 is transmitted to the second coil 26000, the self-resonant frequency of the third coil 23000 and the self-resonant frequency of the second coil 26000 need to have a difference therebetween of 20 kHz, and preferably a difference therebetween of 20 kHz to 3 MHz.

The self-resonant frequency of the third coil 23000 is preferably designed so as to be higher than the self-resonant frequency of the first coil 12000. Furthermore, the self-resonant frequency of the third coil 23000 is preferably designed so as to be higher than the self-resonant frequency of the second coil 26000.

In another embodiment, in order to suppress the transmission of noise generated from the third coil 23000 to the image sensor, a blocking member (not shown) capable of blocking an electromagnetic wave or an electromagnetic field may be provided between the third coil 23000 and the image sensor.

In addition, in order to more efficiently suppress the transmission of noise to the image sensor and the third coil, the third coil 23000 may be designed so as to have a self-resonant frequency of 0.5 MHz to 7 MHz, and the blocking member may be provided.

Meanwhile, the lens moving apparatus according to the embodiments described above may be used in various applications, for example, as a camera module. The camera module may be applied to, for example, mobile appliances such as a cellular phone.

The camera module according to the embodiment may include a lens barrel, coupled to the bobbin 11000, and an image sensor (not shown). The lens barrel may include at least one lens, which transmits an image to the image sensor.

In addition, the camera module may further include an infrared-light blocking filter (not shown). The infrared-light blocking filter serves to inhibit infrared light from being introduced to the image sensor.

In this case, the infrared-light blocking filter may be installed on the position of the base 21000 illustrated in FIG. 23, which corresponds to the image sensor, and may be coupled to a holder member (not shown). In addition, the holder member may support the lower side of the base 21000.

A separate terminal member for electrical conduction with the circuit board 25000 may be installed on the base 21000, and a terminal may be integrally formed using, for example, a surface electrode.

Meanwhile, the base 21000 may function as a sensor holder that protects the image sensor. In this case, a protrusion may be formed on the side surface of the base 21000 so as to protrude downward. However, the protrusion may not be necessary, and although not illustrated, a separate sensor holder may be located below the base 21000.

Figure 36:
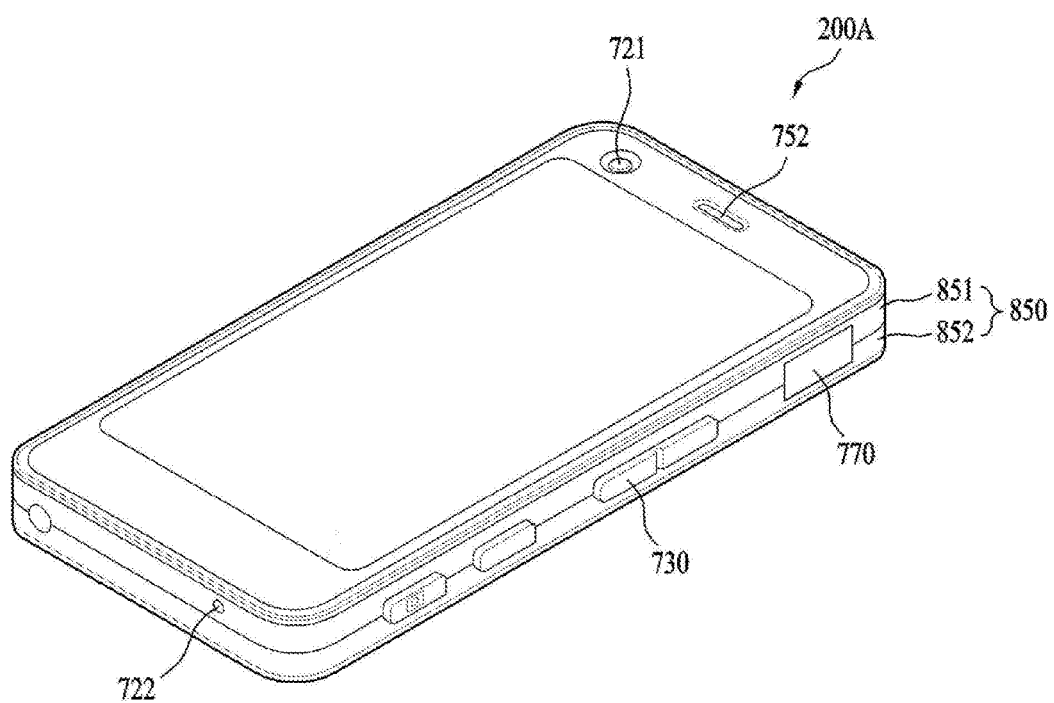
FIG. 36 is a perspective view illustrating a portable terminal according to an embodiment of the present invention.
Figure 37:
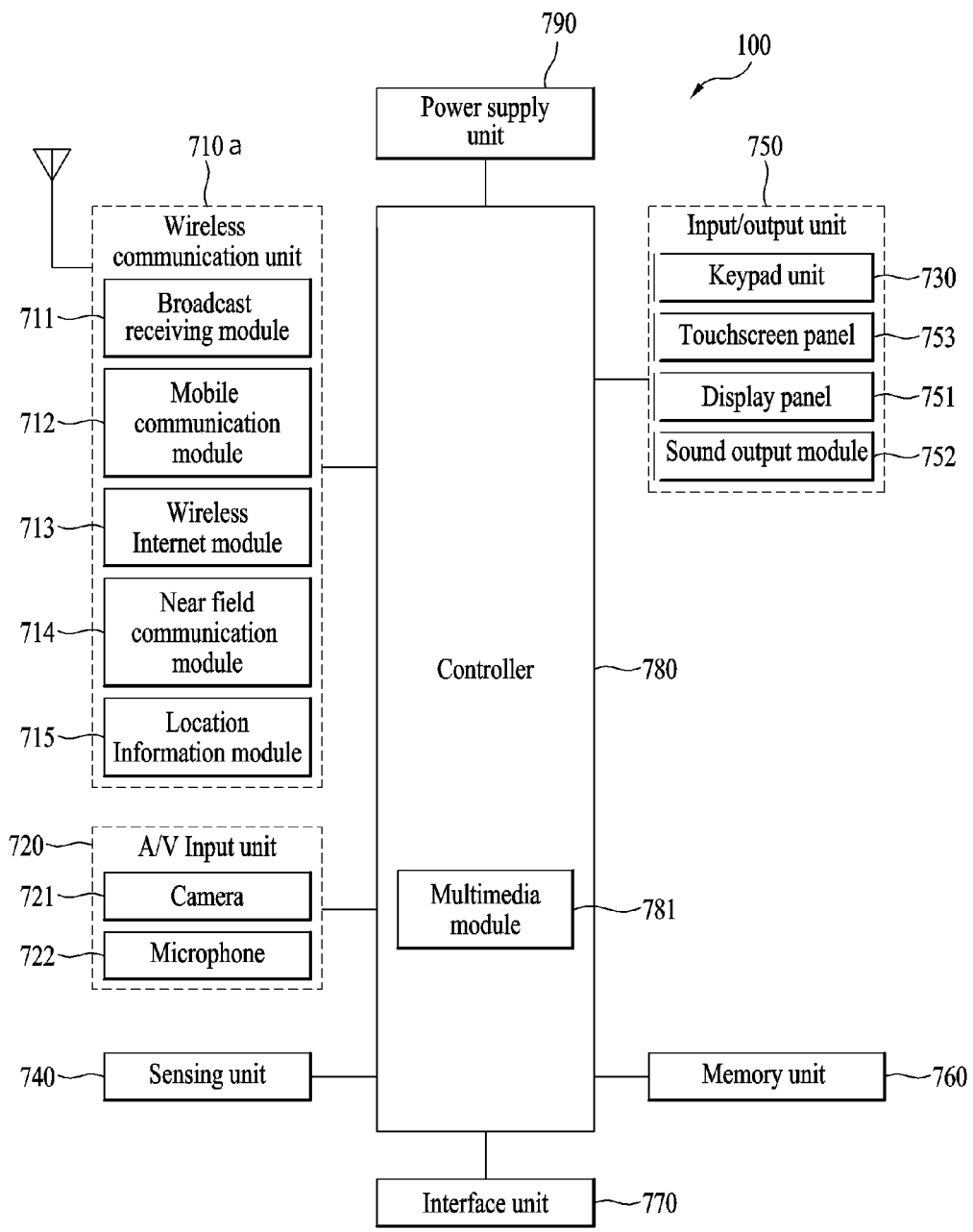
FIG. 37 is a view illustrating the configuration of the portable terminal shown in FIG. 36.

FIG. 36 is a perspective view illustrating a portable terminal 200A according to an embodiment, and FIG. 37 is a view illustrating the configuration of the portable terminal illustrated in FIG. 36.

Referring to FIGS. 36 and 37, the portable terminal 200A (hereinafter referred to as a "terminal") may include a body 850, a wireless communication unit 710*a*, an A/V input unit 720, a sensing unit 740, an input/output unit 750, a memory unit 760, an interface unit 770, a controller 780, and a power supply unit 790.

The body 850 illustrated in FIG. 36 has a bar shape, without being limited thereto, and may be any of various types, such as for example a slide type, a folder type, a swing type, or a swivel type, in which two or more sub-bodies are coupled so as to be movable relative to each other.

The body 850 may include a case (i.e. casing, housing, or cover) defining the external appearance of the terminal. For example, the body 850 may be divided into a front case 851 and a rear case 852. A variety of electronic components of the terminal may be mounted in the space defined between the front case 851 and the rear case 852.

The wireless communication unit 710*a* may include one or more modules, which enable wireless communication between the terminal 200A and a wireless communication system or between the terminal 200A and the network in which the terminal 200A is located. For example, the wireless communication unit 710*a* may include a broadcast receiving module 711, a mobile communication module 712, a wireless Internet module 713, a near field communication module 714, and a location information module 715.

The A/V input unit 720 serves to input audio signals or video signals, and may include, for example, a camera 721 and a microphone 722.

The camera 721 may be the camera 200 including the lens moving apparatus according to the embodiment illustrated in FIGS. 11 and 23.

The sensing unit 740 may sense the current state of the terminal 200A, such as for example the opening or closing of the terminal 200A, the location of the terminal 200A, the occurrence of a user's touch, the orientation of the terminal 200A, or the acceleration/deceleration of the terminal 200A, and may generate a sensing signal to control the operation of the terminal 200A. For example, when the terminal 200A is a slide-type phone, the sensing unit 740 may sense whether the slide-type phone is opened or closed. In addition, the sensing unit 740 serves to sense, for example, whether power is supplied from the power supply unit 790, or whether the interface unit 770 is coupled to an external appliance.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input via a keypad.

The display module 751 may include a plurality of pixels, the color of which varies in response to electrical signals. For example, the display module 751 may include at least one of a liquid crystal display, a thin film transistor liquid crystal display, an organic light-emitting diode display, a flexible display and a 3D display.

The sound output module 752 may output audio data received from the wireless communication unit 710*a* in, for example, a call signal receiving mode, a calling mode, a recording mode, a voice recognition mode, or a broadcast receiving mode, or may output audio data stored in the memory unit 760.

The touchscreen panel 753 may convert variation in capacitance, caused by a user's touch on a specific touchscreen region, into electrical input signals.

The memory unit 760 may store programs for the processing and control of the controller 780, and may temporarily store input/output data (e.g. a phone book, messages, audio, still images, pictures, and moving images). For example, the memory unit 760 may store images captured by the camera 721, for example, pictures or moving images.

The interface unit 770 serves as a passage for connection between the terminal 200A and an external appliance. The interface unit 770 may receive power or data from the external appliance, and may transmit the same to respective constituent elements inside the terminal 200A, or may transmit data inside the terminal 200A to the external appliance. For example, the interface unit 770 may include, for example, a wired/wireless headset port, an external charger port, a wired/wireless data port, a memory card port, a port for the connection of a device having an identification module, an audio input/output (I/O) port, a video I/O port, and an earphone port.

The controller 780 may control the general operation of the terminal 200A. For example, the controller 780 may perform control and processing related to, for example, a voice call, data communication, and a video call. The controller 780 may include a panel controller of a touchscreen panel drive unit, or may perform the function of the panel controller.

The controller 780 may include a multimedia module 781 for the playback of a multimedia file. The multimedia module 781 may be provided inside the controller 780, or may be provided separately from the controller 780.

The controller 780 may perform pattern recognition processing, by which writing or drawing, input to a touchscreen, is perceivable as characters and images, respectively.

The power supply unit 790 may supply power required to operate the respective constituent elements upon receiving external power or internal power under the control of the controller 780.

As is apparent from the above description, the embodiments are able to assure linearity over a wider range, to decrease a defect rate, and to perform more accurate AF feedback control. In addition, the embodiments are able to simplify the structure of the lens moving apparatus and to reduce the manufacturing cost by detecting displacement of the bobbin using the third coil, which generates an electromotive force resulting from the inductive interaction, without having to use an additional position sensor.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
   a housing;
   a bobbin disposed in the housing;
   a first coil disposed on the bobbin;
   a magnet disposed on the housing;
   an upper elastic member connected to an upper portion of the bobbin;
   a second coil disposed on an outer surface of the housing; and
   a circuit board disposed on the housing,
   wherein the bobbin is configured to move in a first direction along an optical axis via an electromagnetic interaction between the first coil and the magnet,
   wherein an induction voltage is generated at the second coil based on an inductive interaction between the first coil and the second coil when the bobbin moves in the first direction, and
   wherein the circuit board comprises first and second terminals for receiving the induction voltage.

2. The lens moving apparatus according to claim 1, wherein the second coil is disposed on an outer side surface of the housing and is positioned above the first coil and positioned below the upper elastic member.

3. The lens moving apparatus according to claim 1, wherein the housing comprises four side walls and the second coil is disposed on the four side walls.

4. The lens moving apparatus according to claim 1, wherein the circuit board is disposed on one side wall of four side walls.

5. The lens moving apparatus according to claim 1, wherein the first coil has a first ring shape and the second coil has a second ring shape, and the first ring shape is not overlapped with the second ring shape in a second direction perpendicular to the first direction.

6. The lens moving apparatus according to claim 1, wherein the circuit board further comprises third and fourth terminals for supplying a driving signal to the first coil.

7. The lens moving apparatus according to claim 6, further comprising a lower elastic member connected to a lower portion of the bobbin.

8. The lens moving apparatus according to claim 7, wherein the upper elastic member comprises first and second upper springs, and the lower elastic member comprises first and second lower springs.

9. The lens moving apparatus according to claim 8, wherein each of the first and second upper springs comprises a first inner frame connected to the upper portion of the bobbin, a first outer frame connected to an upper portion of the housing, and a first connection portion connecting the first inner frame and the first outer frame;
   wherein each of the second lower springs comprises a second inner frame connected to the lower portion of the bobbin, a second outer frame connected to a lower portion of the housing, and a second connection portion connecting the second inner frame and the second outer frame.

10. The lens moving apparatus according to claim 9, wherein one end of the second coil is conductively connected to the first inner frame of the first upper spring, and the other end of the second coil is conductively connected to the first inner frame of the second upper spring.

11. The lens moving apparatus according to claim 10, wherein the first terminal of the circuit board is conductively connected to the first outer frame of the first upper spring, and the second terminal of the circuit board is conductively connected to the first outer frame of the second upper spring.

12. The lens moving apparatus according to claim 9, wherein one end of the first coil is conductively connected to the second inner frame of the first lower spring, and the other end of the first coil is conductively connected to the second inner frame of the second lower spring.

13. The lens moving apparatus according to claim 12, wherein the third terminal of the circuit board is conductively connected to the second outer frame of the first lower spring, and the fourth terminal of the circuit board is conductively connected to the second outer frame of the second lower spring.

14. The lens moving apparatus according to claim 1, wherein the magnet comprises four magnets disposed on the four side walls of the housing.

15. The lens moving apparatus according to claim 1, further comprising a base coupled to the housing.

16. The lens moving apparatus according to claim 1, wherein a driving signal is applied to the first coil and the driving signal comprises a pulse width modulation (PWM) signal and/or a DC signal.

17. The lens moving apparatus according to claim 1, wherein a first distance between a vertical line and the first coil is shorter than a second distance between the vertical line and the second coil, and
   wherein the vertical line is a line that is parallel to the first direction and extends through a center of the housing.

18. The lens moving apparatus according to claim 1, wherein a distance in the first direction between the first coil and the second coil is configured to vary as the first coil and the bobbin move in the first direction, and the induction voltage is generated based on the distance.

19. A camera module comprising:
   a lens moving apparatus according to claim 1;
   a lens barrel coupled to the bobbin; and
   an image sensor.

20. A phone comprising:
   a camera module according to claim 19; and
   a controller,
   wherein the controller is configured to control a driving signal supplied to the first coil based on the induction voltage induced to the second coil.

* * * * *